United States Patent
Yamakita

(10) Patent No.: US 8,369,900 B2
(45) Date of Patent: Feb. 5, 2013

(54) MOBILE TERMINAL AND DISPLAY METHOD OF OPERATIONAL SECTION

(75) Inventor: Takahiro Yamakita, Tokyo (JP)

(73) Assignee: NEC Corporation, Tokyo (JP)

( * ) Notice: Subject to any disclaimer, the term of this patent is extended or adjusted under 35 U.S.C. 154(b) by 233 days.

(21) Appl. No.: 12/738,709

(22) PCT Filed: Aug. 26, 2008

(86) PCT No.: PCT/JP2008/065152
§ 371 (c)(1),
(2), (4) Date: Jul. 7, 2010

(87) PCT Pub. No.: WO2009/050941
PCT Pub. Date: Apr. 23, 2009

(65) Prior Publication Data
US 2010/0267423 A1    Oct. 21, 2010

(30) Foreign Application Priority Data

Oct. 18, 2007  (JP) ................................ 2007-271505
Mar. 25, 2008  (JP) ................................ 2008-078156

(51) Int. Cl.
  *H04B 1/38* (2006.01)
  *H04M 1/00* (2006.01)
(52) U.S. Cl. ......... 455/566; 345/172; 345/173; 345/168
(58) Field of Classification Search ............... 455/550.1, 455/566; 345/173, 172
See application file for complete search history.

(56) References Cited

U.S. PATENT DOCUMENTS

| | | | | |
|---|---|---|---|---|
| 5,864,636 A * | 1/1999 | Chisaka | .................. | 382/189 |
| 7,495,927 B2 * | 2/2009 | Furihata et al. | ............... | 361/760 |
| 2002/0017232 A1 * | 2/2002 | Wehner | ......................... | 116/284 |
| 2003/0052164 A1 | 3/2003 | Higginson | | |
| 2005/0146447 A1 * | 7/2005 | Na | ................................... | 341/26 |
| 2005/0219261 A1 * | 10/2005 | Asai et al. | ..................... | 345/613 |
| 2005/0275632 A1 | 12/2005 | Pu et al. | | |

(Continued)

FOREIGN PATENT DOCUMENTS

| | | |
|---|---|---|
| EP | 1780630 A2 | 5/2007 |
| JP | 2002-318655 A | 10/2002 |

(Continued)

OTHER PUBLICATIONS

International Search Report for PCT/JP2008/065152, mailed Sep. 22, 2008.

(Continued)

*Primary Examiner* — Ajit Patel

(57) ABSTRACT

A mobile terminal and an operation section display method are provided, in which predetermined display data can be displayed in both of key frame inside regions and key frame outside regions in an operation section of the mobile terminal. This is achieved by the mobile terminal including the operation section, a display device, an application control section and a display control section. The operation section has a plurality of keys. The display device displays operation section display data for the operation section. The application control section controls an application instructed by the user who operates the plurality of keys to start. The operation section display data is supplied to the display device when the application is started and the operation section display data is displayed on a region included in the operation section and in both of key frame inside regions and key frame outside regions of each of the plurality of keys.

18 Claims, 23 Drawing Sheets

U.S. PATENT DOCUMENTS

| | | | |
|---|---|---|---|
| 2006/0183505 A1* | 8/2006 | Willrich | 455/566 |
| 2007/0052682 A1 | 3/2007 | Kang et al. | |
| 2007/0094616 A1 | 4/2007 | Won et al. | |
| 2007/0216659 A1 | 9/2007 | Amineh | |
| 2007/0225096 A1* | 9/2007 | Fujita | 474/202 |

FOREIGN PATENT DOCUMENTS

| | | | |
|---|---|---|---|
| JP | 2005-210322 A | 8/2005 | |
| JP | 2005-352987 A | 12/2005 | |
| JP | 2006-191548 A | 7/2006 | |
| JP | 2007-036544 A | 2/2007 | |
| WO | 2004017216 A1 | 2/2004 | |

OTHER PUBLICATIONS

Extended European search report for EP08792710 dated on Jul. 4, 2012.

* cited by examiner

Fig. 5

90-1:KEY FUNCTION TABLE

| APPLICATION TYPE | TEXT EDITION | | | |
|---|---|---|---|---|
| KEY TYPE | KEY FUNCTION | KEY TOP | OUTSIDE KEY FRAME | |
| (1) | KANA-KANJI CONVERSION | CONVERSION | | ← 901-3-1 |
| (2) | RETURN FOR ONE CHARACTER | CLEAR | | ← 901-3-2 |
| (3) | FIX INPUT CHARACTER/CHARACTER | STRING | | ← 901-3-3 |
| (4) | INPUT CHARACTER NUMBER "1" CHARACTERS OF "A" ROW | 1  A | @ | ← 901-3-4 |
| (5) | INPUT CHARACTER NUMBER "2" CHARACTERS OF "KA" ROW | 2  KA | ABC | ← 901-3-5 |
| (6) | INPUT CHARACTER NUMBER "3" CHARACTERS OF "SA" ROW | 3  SA | DEF | ← 901-3-6 |
| (7) ⋮ (15) | | | | |

901-1, 901-2 at header rows.

901-5, 901-6, 901-7, 901-8 (column labels at bottom)

Fig. 6

90-2: KEY FUNCTION TABLE

| APPLICATION TYPE | MUSIC REPLAY | | | |
|---|---|---|---|---|
| KEY TYPE | KEY FUNCTION | KEY TOP | OUTSIDE KEY FRAME | |
| (1) | | | | ← 902-3-1 |
| (2) | | | | ← 902-3-2 |
| (3) | | | | ← 902-3-3 |
| (4) | INCREASE SOUND VOLUME | 1 | + | ← 902-3-4 |
| (5) | DISPLAY MENU OF AUDIO REPLAY APPLICATION | 2 | menu | ← 902-3-5 |
| (6) | RETURN TO MENU | 3 | CLR | ← 902-3-6 |
| (7) | JUMP TO HEAD OF PREVIOUS MUSIC | 4 | ◄◄ | ← 902-3-7 |
| (8) | PAUSE | 5 | ►❙❙ | ← 902-3-8 |
| (9) | JUMP TO HEAD OF NEXT MUSIC | 6 | ►► | ← 902-3-9 |
| (10) | DECREASE VOLUME | 7 | − | ← 902-3-10 |
| (11) ⋮ (15) | | | | |

902-1 (top row), 902-2 (header row)

902-5, 902-6, 902-7, 902-8 (column indicators)

MOBILE TERMINAL AND DISPLAY METHOD OF OPERATIONAL SECTION

The present application is the National Phase of PCT/JP2008/065152, filed on Aug. 26, 2008, which is based on two Japanese Patent Applications, No. 2007-271505, filed on Oct. 18, 2007 and No. 2008-078156 filed on Mar. 25, 2008. The present application enjoys the benefit of priorities based on these applications, and entire disclosures of these applications are incorporated herein by reference.

TECHNICAL FIELD

The present invention relates to a mobile terminal and a display method of an operational section.

BACKGROUND ART

In recent years, various functions have been implemented on so-called mobile terminals such as mobile phones and PHS (Personal Handyphone System) terminals. For example, various kinds of functions such as a mail transmission/reception function, an internet access function, a camera function and a music replay function are implemented in addition to an original telephone function. The various kinds of functions and various kinds of operations in the functions can be executed by pressing keys on an operation section provided for the mobile terminal.

However, the number of keys arranged on the operation section of the mobile terminal is usually limited, and a different operation can be therefore instructed by one key in accordance with a type of function to be executed by the mobile terminal. For example, ten numeral keys from 0 to 9 are usually provided as ten keys of the operation section. For example, when the mobile terminal having such ten keys is used to originate a call, each key is used as the numeral key to input a telephone number. In a case of text input, each key is used as a text input key to input Japanese syllabary. Furthermore, in the case of music replay, one key of the ten keys is used for searching of a next music program and another key thereof is used to stop music replay.

The recent mobile terminal is small in size and the operation section of the mobile terminal has keys which are smaller in size. Accordingly, it is almost impossible to write on one key, all of data to instruct operations executable in the functions. In general, a number in a case of use as the numeral key and a character in a case of use as a text input key (i.e. the character "a" is written on a key by which characters in the A row can be inputted) are written on one key. Accordingly, when the music replay function is used, which of the keys should be pushed to stop music replay could not be understood by the user only by seeing what is written on each key. Thus, the mobile terminal instruction manual is commonly used to confirm and determine the operation.

However, it is troublesome for the user of the mobile terminal to confirm instruction contents of the respective keys by referring to the instruction manual. Therefore, the mobile terminal which is easier to see and use keys is proposed in a related art (for example, Japanese Patent Publication (JP 2005-352987A).

Japanese Patent Publication (JP 2005-352987A) discloses a "key input device". More specifically, in the key input device which allows the characters and/or symbols to be displayed on key tops in an operation panel suitable for small electronic equipments such as a mobile terminal represented by a mobile phone, a switch sheet is arranged on a printed circuit board. An electronic paper is arranged on the switch sheet, and a transparent key sheet having key tops is arranged on the electronic paper. The characters and/or symbols in the key tops are changed by the electronic paper which displays the characters and/or symbols. Therefore, the display of input keys of the electronic equipment can be changed in accordance with a display mode, whereby making it easier to see and use the key input device.

Also, a proposal is made to make it easier for a user of a mobile data terminal to recognize functions assigned to respective operation buttons (or operation keys) in a related art (Japanese Patent Publication JP 2006-191548A).

Japanese Patent Publication (JP 2006-191548A) discloses a "portable data terminal apparatus". More specifically, the portable data terminal device is provided with operation buttons for displaying operation contents by an electronic paper and a function selecting section adapted to select a function used in the portable data terminal device. A display switch section is also provided to switch the operation contents displayed on the electronic paper in accordance with a function selected by the function selection means. Furthermore, when an use state is changed by changing a way of holding the portable data terminal device (such as changing a way of holding from a longitudinal use to a lateral use), contents suitable for the operation pattern are displayed on the operation buttons. Therefore, operation contents displayed on the operation buttons can be switched in accordance with a function used in the portable data terminal device or a use state, whereby operability is improved.

The key input device according to JP 2005-352987A and the portable data terminal device according to JP 2006-191548A are provided to allow the characters and/or symbols to be variably displayed in individual key tops or key frame outside regions. However, the characters and/or symbols are not displayed outside the key frames. Accordingly, if it is desired to display many characters/symbols in one key frame, a key frame corresponding to each key needs to be made larger to expand a displayable region. It is however difficult to expand the key frame corresponding to each key because each key has a small shape in recent mobile terminals as stated above.

Moreover, JP 2005-210322A discloses a technique to change an exterior design by mounting an electronic paper on an externally exposed portion of a mobile terminal. It may be possible to apply this technique and operate various applications. However, the electronic paper mounted on the externally exposed portion makes it difficult to operate various applications only by dial keys. It is also impossible to cope with complicated functions only by side keys.

DISCLOSURE OF THE INVENTION

An object of the present invention is to provide a mobile terminal and an operation section display method, in which predetermined display data can be displayed in both of key frame inside regions and key frame outside regions in an operation section of the mobile terminal.

A mobile terminal according to a first aspect of the present invention has an operation section, a display device, an application control section and a display control section. The operation section has a plurality of keys. The display device displays operation section display data for the operation section. The application control section controls an application instructed by the user who operates the plurality of keys to start. The operation section display data is supplied to the display device when the application is started and the operation section display data is displayed on a region included in the operation section and in both of key frame inside regions and key frame outside regions of each of the plurality of keys.

An operation section display method according to a second aspect of the present invention is achieved by supplying data to a display device and by displaying display data on an operation section. In the supply of the data to the display device, operation section display data is supplied to the display device when an application is started in a mobile terminal and the operation section display data is displayed on a region included in an operation section having the plurality of keys and in both of the key frame inside region and the key frame outside region of each of the plurality of keys. In the display of the data in the operation section, the display device displays the operation section display data in the operation section.

The present invention makes it possible to provide a mobile terminal and an operation section display method, in which predetermined display data can be displayed on both of the key frame inside regions and the key frame outside regions in the operation section of the mobile terminal.

BRIEF DESCRIPTION OF THE DRAWINGS

FIG. 5 is a diagram showing a first example of a key function table;

FIG. 6 is a diagram showing a second example of the key function table;

BEST MODE FOR CARRYING OUT THE INVENTION

Figure 1:
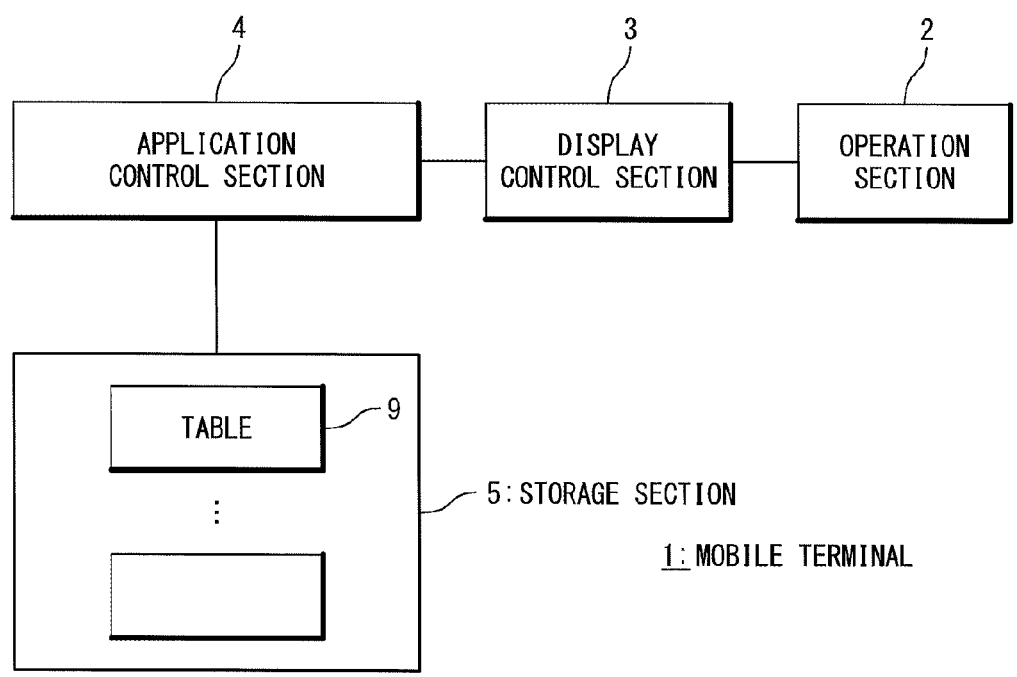
FIG. 1 is a block diagram showing a mobile terminal according to an exemplary embodiment of the present invention.

Hereinafter, the present invention will be described with reference to the attached drawings. FIG. 1 is a block diagram showing a mobile terminal according to one exemplary embodiment of the present invention. The mobile terminal 1 shown in FIG. 1 includes an operation section 2, a display control section 3, an application control section 4 and a storage section 5.

The mobile terminal 1 is a portable terminal device such as a mobile phone, a PHS (Personal Handyphone System) terminal and a PDA (Personal Digital Assistants).

The operation section 2 has a plurality of keys to operate the mobile terminal 1. Each key function is displayed on a display device.

The application control section 4 performs an application control to start any of a plurality of applications owned by the mobile terminal 1.

The storage section 5 stores a table 9 which stores operation section display data for indicating respective functions of the plurality of keys of the operation section 2.

The display control section 3 performs a control to supply the operation section display data to the display device of the operation section 2. More specifically, when the application control section 4 starts any of the plurality of applications, the display control section 3 acquires the operation section display data which represents respective functions of the plurality of keys of the operation section 2 from the table 9 stored in the storage section 5. Next, the display control section 3 supplies to the display device, the operation section display data to be displayed at a key frame internal or outside region of each of the keys in the operation section 2.

In this way, the mobile terminal 1 according to the present exemplary embodiment displays the operation section display data which represent respective key functions inside and outside key frames of the respective keys in the operation section 2 in accordance with each of applications started in the mobile terminal 1. According to the present exemplary embodiment, it is possible to display operation key functions of the mobile terminal 1 so that a user of the mobile terminal 1 can easily understand.

[First Exemplary Embodiment]

A first exemplary embodiment of the present invention in which the exemplary embodiment shown in FIG. 1 is realized more specifically will be described. The mobile terminal 1 according to the exemplary embodiment shown in FIG. 1 corresponds to a mobile terminal 10 according to the first exemplary embodiment shown in FIG. 4. Therefore, a corresponding relation between the mobile terminal 1 shown in the block diagram of FIG. 1 and the mobile terminal 10 shown in the block diagram of FIG. 4 will be described.

Figure 4:
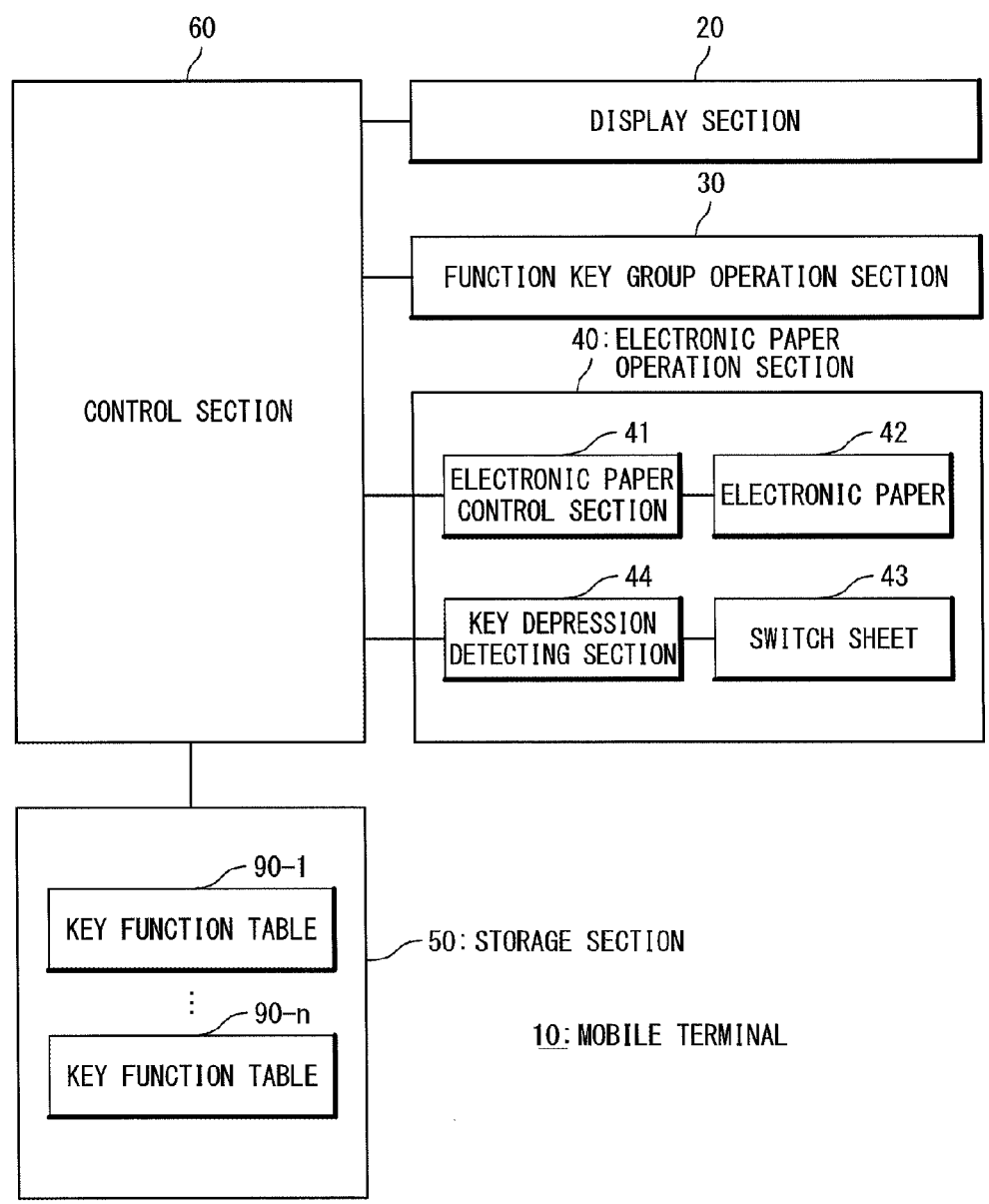
FIG. 4 is a block diagram showing the mobile terminal according to the first exemplary embodiment of the present invention.

It should be noted that an electronic paper is used as the display device in the mobile terminal 10 shown in FIG. 4, while the plurality of keys for operating the mobile terminal 1 are displayed by the display device in the mobile terminal 1 shown in FIG. 1.

The operation section 2 of FIG. 1 corresponds to an electronic paper 42 and a switch sheet 43 in an electronic paper operation section 40 of FIG. 4. The display control section 3 in FIG. 1 also corresponds to an electronic paper control section 41 in FIG. 4. The application control section 4 in FIG. 1 corresponds to a control section 60 shown in FIG. 4. Moreover, the storage section 5 in FIG. 1 corresponds to a storage section 50 shown in FIG. 4, and the tables 9 of the control section 5 in FIG. 1 correspond to key function tables 90 of the storage section 50 shown in FIG. 4.

Figure 2:
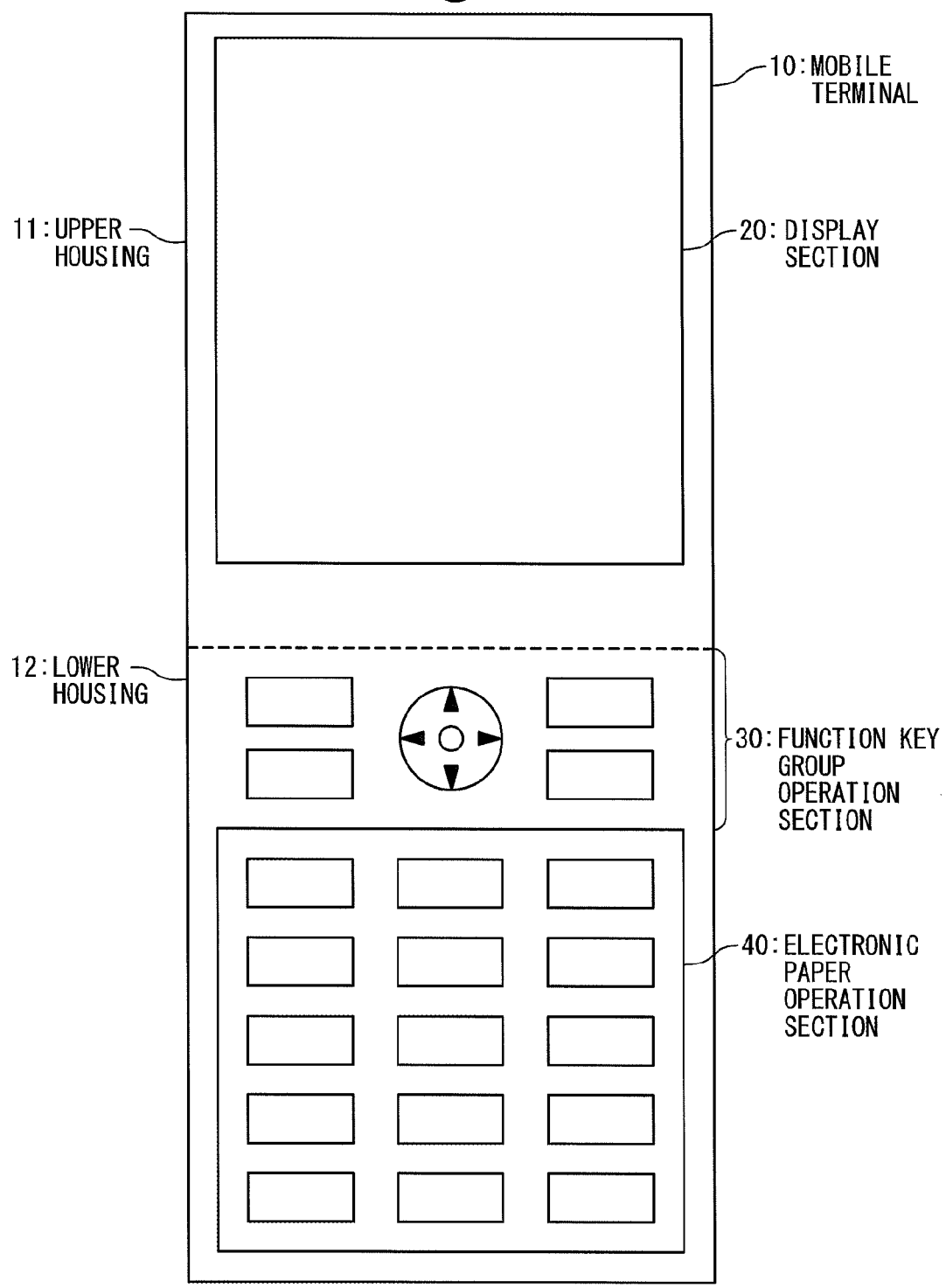
FIG. 2 is a diagram showing an external appearance of a mobile terminal according to a first exemplary embodiment of the present invention.

Referring to FIGS. 2 to 14, the first exemplary embodiment will be described. FIG. 2 is an outer appearance of the mobile terminal according to the first exemplary embodiment. The mobile terminal 10 shown in FIG. 2 has an upper housing 11 and a lower housing 12, and the upper housing 11 includes a display section 20. The lower housing 12 serves as an operation panel surface of the mobile terminal 10, including a function key group operation section 30 and the electronic paper operation section 40. The display section 20 displays data such as characters, symbols and images necessary to operate the mobile terminal 10.

The function key group operation section 30 includes keys necessary to perform various kinds of functions of the mobile terminal 10, including keys such as a power supply key, a menu display key, a function selection key, a cross key, and an using state change key. The power supply key is used to turn on and/or turn off a power supply in the mobile terminal 10. The menu display key is used to control the display section 20 to display a menu of functions provided for the mobile terminal 10. The function selection key is used to select and perform one of functions provided for the mobile terminal 10. The cross key is used to move a cursor displayed on the display section 20 in upper, bottom left and right directions. The use state change key is used to change a use state of the mobile terminal 10, or more specifically to change the use state of the mobile terminal 10 between a longitudinal form and a lateral form.

The electronic paper operation section 40 is an operation section including various kinds of keys necessary to operate the mobile terminal 10, other than the keys contained in the function key group operation section 30. The various kinds of keys contained herein are, for example, ten keys for inputting numbers from 0 to 9 and other keys provided for general phones such as a "*" key and a "#" key, a call start key and a call end key.

In the first exemplary embodiment, the electronic paper operation section 40 is made from an electronic paper serving as a display device which is thin, light and bendable like a paper. The contents displayed on the electronic paper can be changed by changing a voltage to be supplied to each portion of the electronic paper. For example, it is possible to realize display/non-display in the key frames of respective keys (i.e. substantially square frames each of which shows a key range), and also display and/or erase characters, symbols and/of images inside or outside the key frames. FIG. 2 shows as one example, 3×5 key frames displayed on the electronic paper operation section 40.

Figure 3:
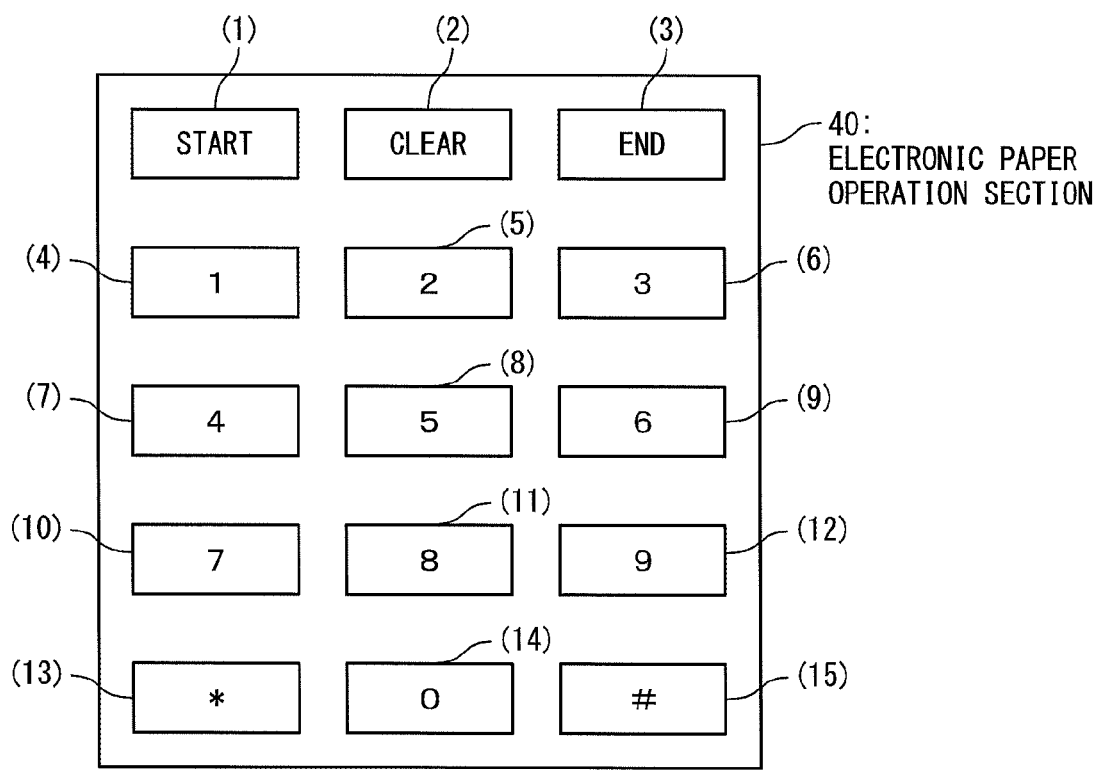
FIG. 3 is a diagram showing one display example of various kinds of keys in an electronic paper operation section.

It should be noted that one example is shown in FIG. 3 to further specifically present various kinds of key functions displayed on the electronic paper operation section 40. FIG. 3 shows one display example of various kinds of keys displayed on the electronic paper operation section. 3×5 (=15) keys provided with reference numerals (1) to (15) are displayed on the electronic paper operation section 40 as shown in FIG. 3. A key for use in making a call is exemplified by each of these keys.

The reference numerals (4) to (12) and (14) on the electronic paper operation section 40 are so-called ten keys and used to input a telephone number of a counter party. Numbers including "1" to "9" and "0" are displayed inside the key frames of the ten keys.

Characters indicating "start" are displayed on the left side key (1) in an uppermost row in the electronic paper operation section 40, and indicate that the key is used to make a call after inputting a telephone number. Also, characters indicating "clear" are displayed on the key (2), and indicate that the key is used to return a cursor by one digit in inputting the telephone number. The key (3) is used to end a call. Furthermore; the key (13) is a "*" key and the key (15) is a "#" key.

It should be noted that display of the respective keys in FIG. 3 exemplifies display suitable for using the mobile terminal 10 in a longitudinal use state.

Next, a configuration of the mobile terminal 10 according to the first exemplary embodiment will be described with reference to FIG. 4. FIG. 4 is a block diagram showing the mobile terminal according to the first exemplary embodiment. It should be noted that same reference numerals assigned to components shown in FIG. 2 are assigned to same components shown in FIG. 4 and explanation thereof will be omitted as much as possible.

The mobile terminal 10 shown in FIG. 4 includes the display section 20, the function key group operation section 30, the electronic paper operation section 40, the storage section 50 and the control section 60. The display section 20 displays data such as characters, symbols and images outputted from the control section 60. The function key group operation section 30 includes a key (which may be plural keys) necessary to perform various kinds of functions of the mobile terminal 10, and outputs a signal indicating a type of a pushed key to the control section 60 when any of the keys is pushed.

The electronic paper operation section 40 includes a plurality of keys necessary to operate the mobile terminal 10. Although explanation is made in the first exemplary embodiment on the assumption that 3×5 (=15) keys are contained in the same manner as the explanation of FIG. 2, the present invention is not limited to this value in the number of keys included in the electronic paper operation section 40. The electronic paper operation section 40 includes the electronic paper control section 41, the electronic paper 42, the switch sheet 43 and a key depression detecting section 44.

The electronic paper control section 41 receives from the control section 60, a type of application program (to be briefly referred to as an application hereinafter) executed by the control section 60 and a key function table corresponding to the application. Stored in the key function table are functions which are used in the application and assigned to the respective keys on the electronic paper operation section 40, and operation section display data such as characters and/or symbols to represent the functions. The key function table will be described later.

Next, the electronic paper control section 41 determines the characters and/or symbols to be displayed in a key frame inside region, i.e. in a key top of each of keys in the electronic paper operation section 40 and in a key frame outside region by referring to the key function table. The electronic paper control section 41 controls the electronic paper 42 to display the determined characters and/or symbols (i.e. first sub operation section display data) in the key tops, each of which is disposed inside a substantially square frame of the key frame, and the determined characters and/or symbols (i.e. second sub operation section display data) in the key frame outside regions.

The electronic paper 42 performs a display as instructed by a control of the electronic paper control section 41. It should be noted that the electronic paper 42 may be able to perform only monochromatic display or may also be able to perform color display.

The switch sheet 43 is provided with a plurality of tact switches, each of which is turned on by pressing the switch and turned off by use of spring force when a finger is moved from the switch. In the first exemplary embodiment, 3×5 (=15) tact switches are provided on the sheet in the same manner as the explanation of FIG. 2. The switch sheet 43 is also arranged below the electronic paper 42. That is, the electronic paper 42 and the switch sheet 43 constitute keys used in the first exemplary embodiment. The configurations of the electronic paper 42 and the switch sheet 43 will be described later.

The key depression detecting section 44 detects that any of the tact switches of the switch sheet 43 is pushed or any of the keys of the electronic paper operation section 40 is pushed, and outputs a signal indicating a type of the pushed key to the control section 60.

The storage section 50 stores applications (i.e. application programs) to perform various kinds of functions in the mobile terminal 10 and stores data necessary to perform each of the applications, data generated by each of the applications and/or data to set up the mobile terminal 10 (not shown).

The storage section 50 also stores the key function tables 90 (90-1, . . . , 90-n) for the applications. The number of key function tables 90 is the same as the number of the applications in the mobile terminal 10. Here, each of the key function tables is identified by using codes of 90-1 to 90-n.

The control section 60 includes CPU (Central Processing Unit, not shown) which control the entire operations in the mobile terminal 10 through operation of the CPU. It should be noted that an application (i.e. application program) for operating the CPU is stored in the storage section 50 as stated above.

Next, the key function tables 90 stored in the storage section 50 will be described with reference to FIGS. 5 and 6. FIG. 5 shows a first example of the key function table. The key function table 90-1 shown in FIG. 5 exemplifies a key function table used when a "text edition application" is executed on the mobile terminal 10.

The key function table 90-1 shown in FIG. 5 is provided with a column (in a row 901-1 in FIG. 5) for an application type which indicates which of the applications uses the key function table 90. In the row 901-1 in FIG. 5, "text edition" is shown as an application type. Accordingly, the key function table 90-1 is a table used when an application to perform the "text edition" is executed in the mobile terminal 10.

The key function table 90-1 is also provided with columns allocated to a key type (in a column 901-5), a key function (in a column 901-6), a key top (in a column 901-7) and an key frame outside region (in a column 901-8), as shown in the row 901-2.

The key type column (the column 901-5) shows the types of keys in the electronic paper operation section 40 as exemplified in FIG. 3. In FIG. 5, the types of keys are represented by codes from (1) to (15) in the same manner as those exemplified in FIG. 3. For example, the code (1) is shown in a row 901-3-1 in the key type column (in the column 901-5). It suggests that a left end key in the uppermost row in the electronic paper operation section 40 (i.e. the key (1) in FIG. 3) is shown here.

A text to describe a function of a concerned key is shown in a key function column (in a column 901-6). For example, the key type (1) in the row 901-3-1 has a key function to "perform KANA-KANJI conversion". It is also suggested that the key type (5) in the row 901-3-5 has a key function to "input character of the number "2", any character of "ka", "ki", "ku", "ke" and "ko" in a "ka" row, and any alphabet of "A", "B" and "C".

The first sub operation section display data such as the characters and/or symbols displayed in the key frame inside region of the each key or in a key top thereof is shown in the key top column (in the column 901-7). For example, characters of "conversion" are displayed in a key top of a key corresponding to the key type (1) in the row 901-3-1. The characters of "conversion" briefly represent that the key (1) has a function to "perform KANA-KANJI conversion".

Also, the number "2" and the character "ka" are displayed in a key top of a key corresponding to the key type (5) in the row 901-3-5.

The second sub operation section display data such as characters and/or symbols displayed outside the key frame of each key or in the key frame outside region are shown in the key frame outside region column (in the column 901-8). For example, it is shown that "nothing is displayed" in the key frame outside region of a key corresponding to the key type (1) in the row 901-3-1. This is because the key frame outside region (i.e. a region disposed in a cross point of the row 901-3-1 and the column 901-8) has a "blank" space.

Meanwhile, it is shown that the alphabets of "ABC" are displayed in the key frame outside region of a key corresponding to the key type (5) in the row 901-3-5. What is briefly represented by the characters of "ABC" shows that the key (5) has a function to "input the alphabets of ABC".

Next, another example of the key function table 90 stored in the storage section 50 will be described with reference to FIG. 6. It should be noted that all the key function tables 90 (90-1 to 90-n) have the same configuration. Accordingly, the table shown in FIG. 6 has the same configuration as that shown in FIG. 5 and explanation thereof will be omitted as much as possible.

FIG. 6 shows a second example of the key function table. The key function table 90-2 shown in FIG. 6 exemplifies a key function table used when a "music replay application" is executed in the mobile terminal 10.

The key function table 90-2 shown in FIG. 6 is provided with a column of an application type (in the row 902-1 in FIG. 6) to indicate which of applications is used in the key function table 90, and "music replay" is shown as an application type. Accordingly, it is shown that the key function table 90-2 is used when an application to perform "music replay" is executed in the mobile terminal 10.

The key function table 90-2 is also provided with columns for a key type (in a column 902-5), a key function (in a column 902-6), a key top (in a column 902-7) and an key frame outside region (in a column 902-8), as shown in a row 902-2. Since these columns (i.e. columns 902-5 to 902-8) are similar to those in the key function table 901 shown in FIG. 5, further explanation of the respective columns will be omitted. However, contents described in the key function table 90-2 will be briefly described below.

Key types (1) to (3) shown in the rows 902-3-1 to 902-3-3 in FIG. 6 includes blank spaces entirely in the columns of the key function (in the column 902-6), the key top (in the column 902-7) and the key frame outside region (in the column 902-

8). Accordingly, it is shown that these keys (1) to (3) are not used in the "music replay application".

It is shown in the row 902-3-4 in FIG. 6 that a key type (4) has a function to "increase sound volume" and "1" is displayed in a key top thereof and a symbol "+" is displayed in the key frame outside region.

It is shown in the row 902-3-5 in FIG. 6 that a key type (5) has a function to "display a menu of a music replay application" and "2" is displayed in a key top thereof and characters of "menu" are displayed in the key frame outside region thereof.

It is shown in the row 902-3-7 in FIG. 6 that a key type (7) has a function to "jump to the head of a previous music" and "4" is displayed in a key top thereof and a symbol indicating jumping to the head of the previous music is displayed in the key frame outside region thereof. In the first exemplary embodiment, a symbol (i.e. a symbol having two arrow heads directed in a left direction on the right side of a vertical line) is shown in a region disposed in a cross point between the row 902-3-7 and the column 902-8 to indicate jumping to the head of the previous music.

Figure 7:
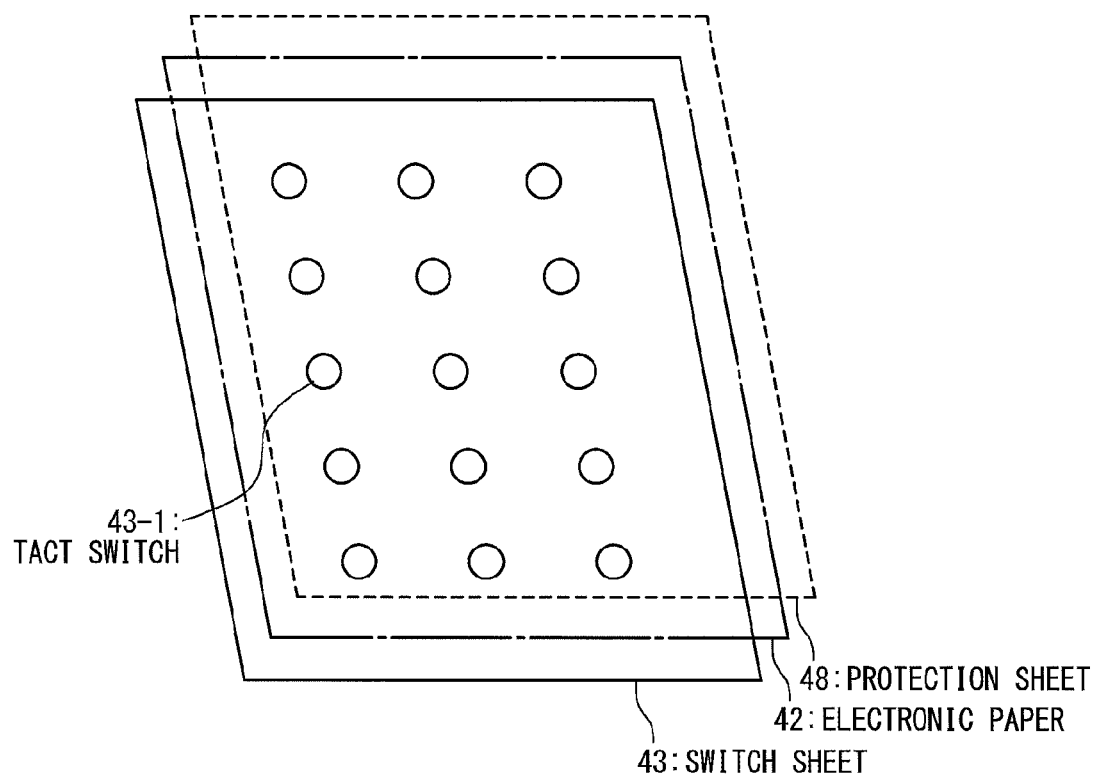
FIG. 7 is a diagram showing one constitution example of the electronic paper operation section.

Next, the configuration of the electronic paper 42 and the switch sheet 43 in the electronic paper operation section 40 will be described with reference to FIG. 7. FIG. 7 shows one example of the electronic paper operation section 40. The electronic paper operation section 40 shown in FIG. 7 includes the electronic paper 42 arranged on the switch sheet 43, and a transparent protection sheet 48 arranged on the electronic paper 42.

The switch sheet 43 is provided with 3×5 (=15) tact switches 43-1 on the sheet according to an arrangement similar to that exemplified in FIG. 3. The electronic paper 42 displays characters and/or symbols in accordance with an instruction from the electronic paper control section 41 shown in FIG. 4.

The protection sheet 48 is a sheet made of a transparent soft material in order to protect the electronic paper 42. Key frames of 3×5 (=15) keys (i.e. substantially rectangular frames, each of which indicates the boundary of a key") may be printed in advance in the protection sheet 48 according to an arrangement similar to that exemplified in FIG. 3. In this case, the key frames of the 15 keys printed on the protection sheet 48 are arranged to be consistent with the tact switches 43-1 arranged on the switch sheet 43 disposed therebelow. Accordingly, if a portion corresponding to a left-end key frame in an uppermost row in the protection sheet 48 (i.e. the key 1) in FIG. 3) is pushed, a left-end tact switch 43-1 in an uppermost row in the switch sheet 43 is pushed.

It should be noted that the electronic paper control section 41 and the key depression detecting section 44 in the electronic paper operation section 40 shown in FIG. 4 are assumed to be mounted on a circuit substrate not shown in FIG. 7.

Figure 8:
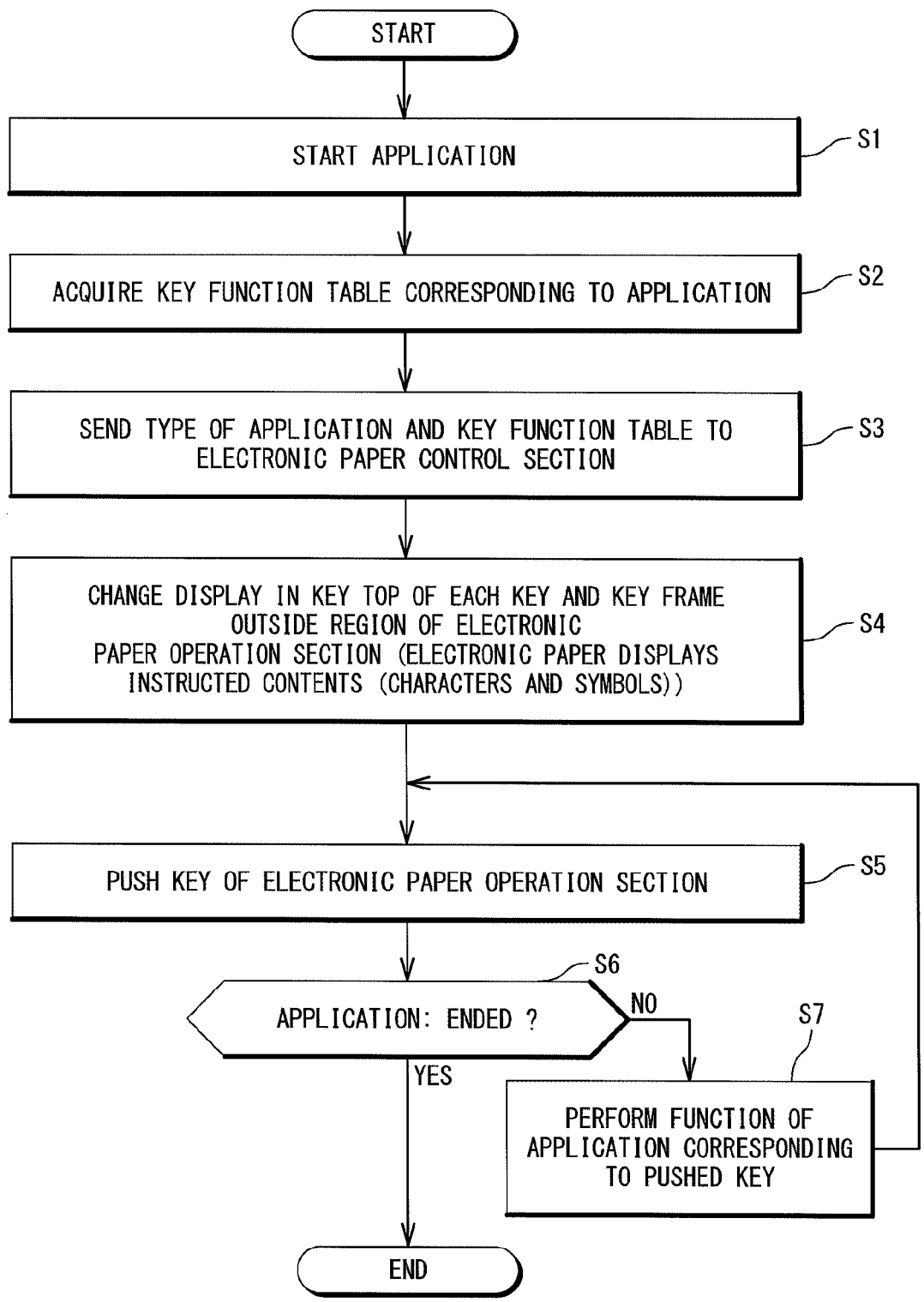
FIG. 8 is a first flowchart showing an operation in the mobile terminal according to the first exemplary embodiment of the present invention.

Next, an operation of the mobile terminal 10 according to the first exemplary embodiment will be described with reference to FIG. 8. FIG. 8 is a first flowchart showing an operation of the mobile terminal according to the first exemplary embodiment. Initially, it is assumed that a power supply is turned on in the mobile terminal 10 and various kinds of functions are brought into a startable state in the mobile terminal 10. At this time, the electronic paper operation section 40 of the mobile terminal 10 is assumed to have display contents as shown in FIG. 3.

Here, when the user of the mobile terminal 10 starts one of a plurality of functions of the mobile terminal 10, an application (i.e. application program) to execute the function is started (step S1 in FIG. 8). The start of the function is performed through operations of the keys such as a menu display key, a function selection key and a cross key in the function key group operation section 30 of the mobile terminal 10. More specifically, the control section 60 of the mobile terminal 10 detects operations of any of the key in the function key group operation section 30 so as to start a selected function corresponding to the key operation. It should be noted that a case where an application to perform a "text edition" function is started will be described here.

The control section 60 starts an application for performing a function selected by the user and acquires the key function table 90 corresponding to the application from the storage section 50 (step S2). Since the "text edition" application has been started, the key function table 90-1 (which is the key function table 90-1 shown in FIG. 5) is read out. Then, the control section 60 transmits a type of the started application (which is the "text edition" application in this example) and the key function table 90 (which is the key function table 90-1 in this example) to the electronic paper control section 41 in the electronic paper operation section 40 (step S3).

The electronic paper control section 41 refers to the key function table 90 obtained from the control section 60 to recognize functions assigned to the respective keys in the electronic paper operation section 40. Next, the electronic paper control section 41 acquires characters and/or symbols to be displayed in the key top and the key frame outside region for each of the keys in the electronic paper operation section 40 from the key function table 90. Then, the electronic paper control section 41 controls the electronic paper 42 so as for the characters and/or symbols to be displayed in the key top and the key frame outside region for each key in positions corresponding to each key on the electronic paper 42 (step S4). Therefore, display contents (such as the characters and/or symbols) instructed by the electronic paper control section 41 are displayed on the electronic paper 42. One example of display contents to be displayed on the electronic paper 42 will be described later by referring to FIG. 9.

Next, in order to perform any of the functions of the started application, the user of the mobile terminal 10 presses a desired key in the electronic paper operation section 40 (step S5). The key depression detecting section 44 in the electronic paper operation section 40 detects key depression and outputs a signal indicating a type of the pushed key to the control section 60. The control section 60 checks whether or not the type of pushed key is used to end the application (step S6).

If the type of pushed key is not used to end the application (no in step S6), the control section 60 control the application being currently executed to perform a function corresponding to the pushed key (step S7). A control flow will return to the step S5. In contrast, if the type of pushed key is used to end the application (yes in step S6), the control section 60 end the application being currently executed.

Figure 9:
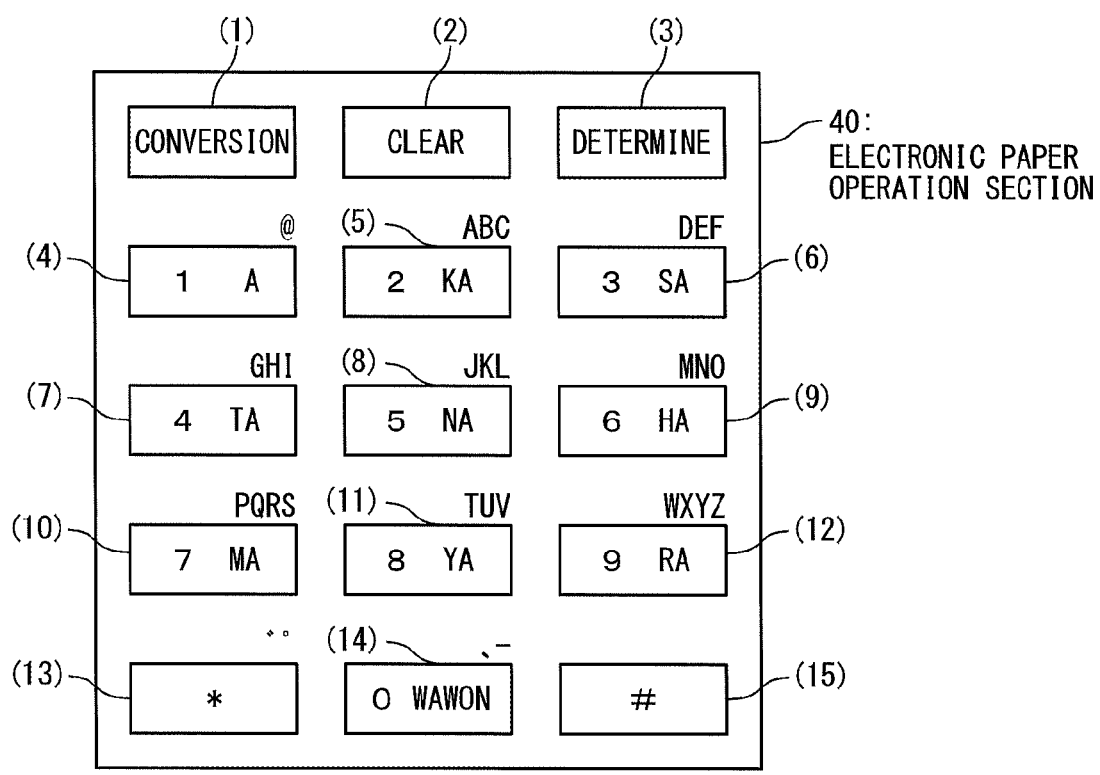
FIG. 9 is a diagram showing a display example of the electronic paper operation section when a text edition application is started.

Next, one example of display contents on the electronic paper operation section 40 when the "text edition" application is executed will be described with reference to FIG. 9. FIG. 9 shows a display example of the electronic paper operation section upon the execution of the text edition application. It should be noted that the same reference numeral shown in FIG. 9 refer to the same component and keys shown in FIG. 3 and explanation thereof will be omitted.

The characters and/or symbols such as "conversion", "clear", "determination", "1 a" and "2 ka", . . . are displayed in the key tops of the respective keys (1) to (15) in the electronic paper operation section 40 shown in FIG. 9. These display contents are displayed by referring to contents (in the rows 901-3-1, 901-3-2, . . . shown in FIG. 5) shown in the key top column (in the column 901-7 in FIG. 5) in the key function table 90-1 (shown in FIG. 5) for the "text edition" application without any change.

Moreover, nothing is displayed in the key frame outside regions of the keys (1), (2) and (3) shown in FIG. 9. This is because the key function table 90-1 for the "text edition" application has blank spaces for the key types (1), (2) and (3) in the key frame outside region column (in the column 901-8 in FIG. 5).

Furthermore, the characters and/or symbols such as "@", "ABC", "DFE", . . . are displayed in the key frame outside regions of the keys (4), (5), (6), . . . in the electronic paper operation section 40 shown in FIG. 9. These display contents are displayed by referring to contents (in the rows 901-3-4, 901-3-5, . . . in FIG. 5) in the key frame outside region column (in the column 901-8 in FIG. 5) in the key function table 90-1 (shown in FIG. 5) for the "text edition" application without any changes.

As described above, when an application is started in the mobile terminal 10, key functions used in the application are displayed in the key tops and the key frame outside regions of the respective keys in the electronic paper operation section 40 of the mobile terminal 10. The characters and/or symbols are displayed in the key tops and the key frame outside regions of the respective keys in the electronic paper operation section 40 by referring to the characters and/or symbols shown in the key top column and the key frame outside region column in the key function table 90 corresponding to the application without any changes.

Next, another example of operating the mobile terminal 10 according to the first exemplary embodiment will be described with reference to FIG. 8 in the same manner as the above explanation. The other example of operating the mobile terminal 10 when an application for a "music replay" function is started in the mobile terminal 10 will be described.

Initially, when the "music replay" function selected from the plurality of functions of the mobile terminal 10 is started by the user of the mobile terminal 10, the application for the function is started (step S1 in FIG. 8). The control section 60 starts the application for the function selected by the user and reads the key function table 90 corresponding to the application from the storage section 50 (step S2). Here, since the "music replay" application is started, the key function table 90-2 (which is the key function table 90-2 shown in FIG. 6) is acquired. Then, the control section 60 transmits a type of the started application (which is the "music replay" application in this example) and the key function table 90 (which is the key function table 90-2 in this example) to the electronic paper control section 41 in the electronic paper operation section 40 (step S3).

The electronic paper control section 41 refers to the key function table 90 read by the control section 60 to recognize functions assigned to the respective keys in the electronic paper operation section 40. Next, the electronic paper control section 41 obtains characters and/or symbols displayed in a key top and a key frame outside region of each of the keys of the electronic paper operation section 40 from the key function table 90. Then, the electronic paper control section 41 controls the electronic paper 42 to display the obtained characters and/or symbols for the key tops and the key frame outside regions of the respective keys in positions of each of the respective keys on the electronic paper 42 (step S4).

Therefore, display contents (such as the characters and/or symbols) instructed by the electronic paper control section 41 are displayed on the electronic paper 42. One example of display contents to be displayed on the electronic paper 42 will be described with reference to FIG. 10. It should be noted that operations in the step S5 and the subsequent are the same as those in the above "text edition" application, so that explanation thereof will be omitted.

Figure 10:
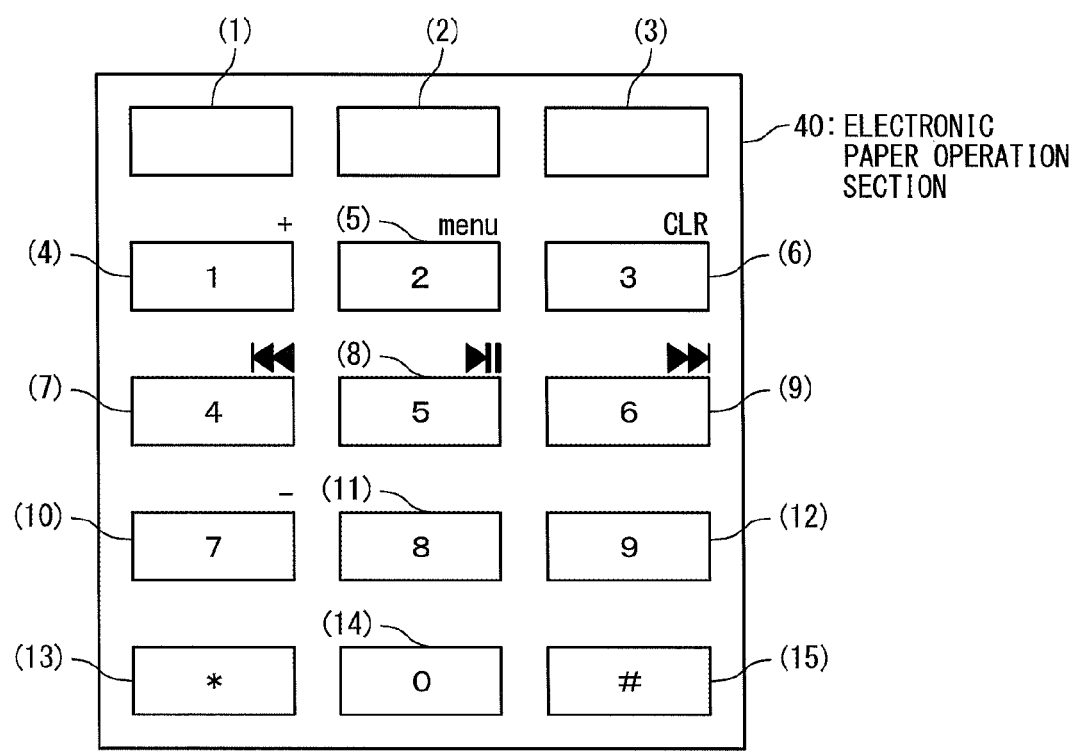
FIG. 10 shows a display example of the electronic paper operation section when a music replay application is started.

FIG. 10 shows a display example of the electronic paper operation section when the music replay application is started. It should be noted that the same reference numerals and codes shown in FIG. 10 are assigned to the same components and keys shown in FIG. 3 and explanation thereof will be omitted.

Nothing is displayed in the key tops and the key frame outside regions for the keys (1), (2) and (3) in the electronic paper operation section 40 shown in FIG. 10. This is because the key function table 90-2 for the "music replay" application has blank spaces for the key types (1), (2) and (3) in the key function column (in the column 902-6 in FIG. 6), the key top column (in the column 902-7) and the key frame outside region column (in the column 902-8). More specifically, it is shown that the keys (1), (2) and (3) in the electronic paper operation section 40 are not used in the "music replay" application.

Numerals and symbols such as "1", "2", "3", "4", . . . are respectively displayed in the key tops of the keys (4) to (15) in the electronic paper operation section 40 shown in FIG. 10. These display contents are displayed by referring to contents (in the rows 902-3-4, 902-3-5, . . . in FIG. 6) in the key top column (in the column 902-7 in FIG. 6) in the key function table 90-2 for the "music replay" application (shown in FIG. 6) without any changes.

Also, the characters and/or symbols such as "+", "menu", "CLR", . . . are respectively displayed in the key frame outside regions of the keys (4) to (10) in the electronic paper operation section 40 shown in FIG. 10. These display contents are displayed by referring to contents (in the rows 902-3-4 to 902-3-10 in FIG. 6) in the key frame outside region column (in the column 902-8 in FIG. 6) in the key function table 90-2 for the "music replay" application (shown in FIG. 6) without any change.

As described above, when the "music replay" application is started in the mobile terminal 10, the key functions used in the application are also displayed in the key tops and the key frame outside regions for the respective keys in the electronic paper operation section 40 of the mobile terminal 10. The characters and/or symbols are displayed in the key tops and the key frame outside regions of the respective keys in the electronic paper operation section 40 by referring to the characters and/or symbols in the key top column and the key frame outside region column in the key function table 90 corresponding to the application without any change.

Next, a second example of operating the mobile terminal 10 according to the first exemplary embodiment will be described with reference to FIGS. 11 and 12. The second example of operating the mobile terminal 10 according to the first exemplary embodiment differs from the operation described with reference to FIG. 8 in the following viewpoints.

That is, in FIG. 8, when an application is started, the control section 60 reads the key function table 90 corresponding to the application from the storage section 50. Next, the control section 60 transmits a type of the started application and the key function table 90 obtained from the storage section 50 to the electronic paper control section 41. The electronic paper control section 41 displays the characters and/or symbols, which represent functions of the respective keys, in the key tops and in the key frame outside regions for the respective keys on the electronic paper 42 of the electronic paper operation section 40 based on the key function table 90. Through this operation, the functions of the respective keys are shown on the electronic paper operation section 40 in a form suitable for a longitudinal use state of the mobile terminal 10 as exemplified in FIGS. 9 and 10.

Meanwhile, in the second operation example according to the first exemplary embodiment, the control section 60 transmits a use state of the mobile terminal 10 to the electronic paper control section 41, in addition to the type of the started application and the key function table 90 corresponding to the application. The electronic paper control section 41 controls the electronic paper 42 to display the characters and/or symbols, which represent functions of the respective keys in the electronic paper operation section 40, so as to be suitable for the use state (i.e. longitudinal use state or lateral use state) of the mobile terminal 10.

Figure 11:
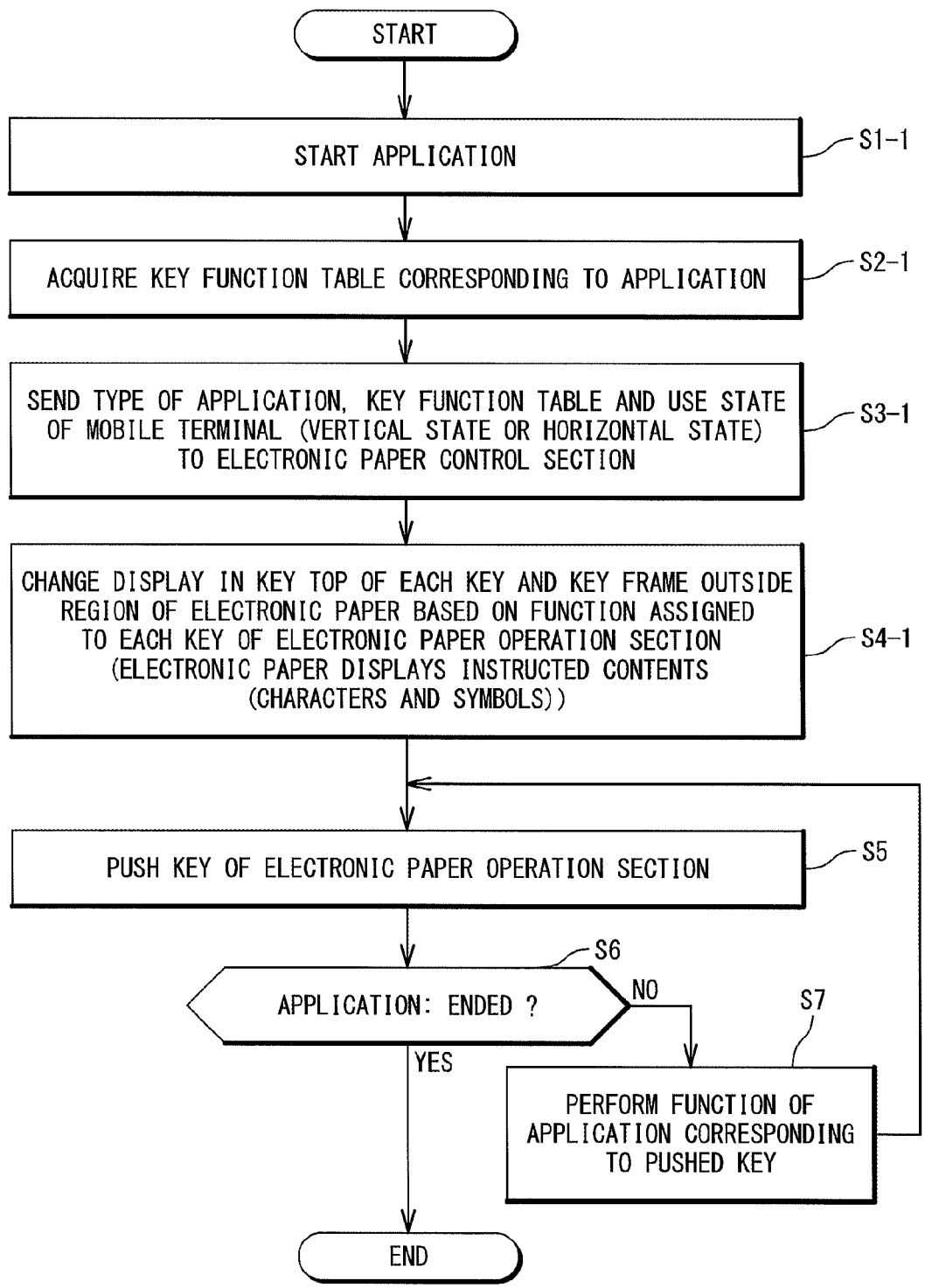
FIG. 11 is a second flowchart showing an operation of the mobile terminal according to the first exemplary embodiment of the present invention.

FIG. 11 is a second flowchart showing the second operation example of the mobile terminal according to the first exemplary embodiment. It should be noted that the same reference numerals and codes shown in FIG. 11 area assigned to the same component elements shown in FIG. 8 and explanation thereof will be omitted as much as possible.

Initially, it is assumed in the mobile terminal 10 that a power supply has been turned on and various kinds of functions are brought into a startable state. Here, when one function selected from the plurality of functions of the mobile terminal 10 is started by the user of the mobile terminal 10, an application for the function is started (step S1-1 in FIG. 11). The selected function is started by operating the keys such as a menu display key, a function selection key and a cross key in the function key group operation section 30 of the mobile terminal 10. More specifically, the control section 60 of the mobile terminal 10 detects an operation of any of keys of the function key group operation section 30 and starts the selected function corresponding to the key operation. In starting the selected function, the control section 60 also detects the use state (i.e. longitudinal use state or lateral use state) of the mobile terminal 10. The use state of the mobile terminal 10 can be detected based on operation of a use state change key in the function key group operation section 30. It should be noted that explanation will be made here on the assumption that the application for the "music replay" function is started.

The control section 60 has started the application for the function selected by the user and read the key function table 90 corresponding to the application from the storage section 50 (step S2-1). Since the "music replay" application is started, the key function table 90-2 (which is the key function table 90-2 shown in FIG. 6) is obtained. The control section 60 transmits a type of the started application (which is the "music replay" application), the key function table 90 (which is the key function table 90-2) and the use state (which is either longitudinal or lateral) of the mobile terminal 10 to the electronic paper control section 41 in the electronic paper operation section 40 (step S3-1).

The electronic paper control section 41 refers to the key function table 90 received from the control section 60 to recognize the functions assigned to the respective keys in the electronic paper operation section 40. Next, the electronic paper control section 41 acquires characters and/or symbols to be displayed in the key tops and in the key frame outside regions for the respective keys in the electronic paper operation section 40 from the key function table 90. The electronic paper control section 41 controls the electronic paper 42 to display the character and symbols in the key tops and the key frame outside regions for the respective keys on the electronic paper 42 in a form suitable for an use state (which is either longitudinal or lateral) (step S4-1). The operations in the step S5 and the subsequent are the same as those described in FIG. 8, and explanation thereof will be omitted.

Therefore, the display contents (such as the characters and/or the symbols) instructed by the electronic paper control section 41 are displayed on the electronic paper 42 in a form suitable for the use state of the mobile terminal 10. One example of display contents displayed on the electronic paper 42 (in the case of a use state instructed as a "lateral" state) will be described referring to FIG. 12.

Figure 12:
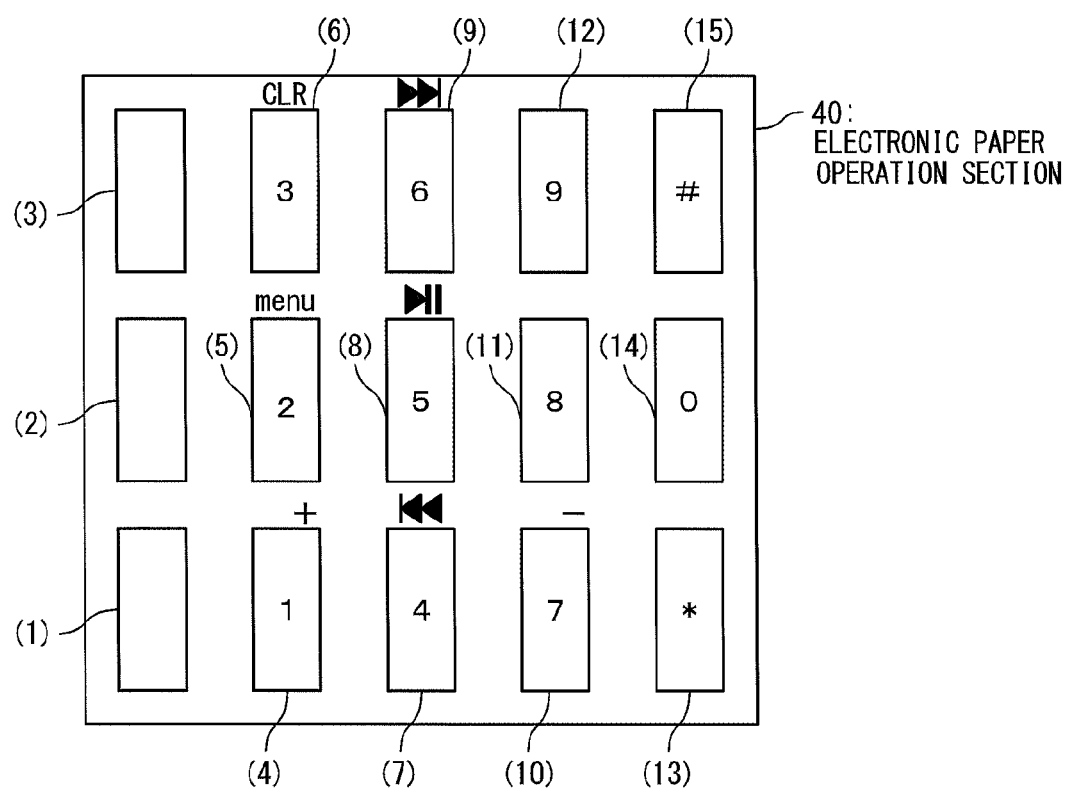
FIG. 12 shows a display example of the electronic paper operation section when the music replay application is started in a "lateral" use state of the mobile terminal.

FIG. 12 shows a display example of the electronic paper operation section observed when the music replay application is started in a "lateral" use state of the mobile terminal. It should be noted that like reference numeral and codes shown in FIG. 12 refer to corresponding component elements and keys shown in FIG. 3 and explanation thereof will be omitted.

Nothing is displayed in the key tops and key frame outside regions for the keys (1), (2) and (3) in the electronic paper operation section 40 shown in FIG. 12. This is because the key function table 90-2 for the "music replay" application (shown in FIG. 6) has blank spaces entirely in the columns of the key types (1), (2) and (3) (in the column 902-6 in FIG. 6), the key top (in the column 902-7) and the key frame external (in the column 902-8) under the key function. More specifically, it is shown that the keys (1), (2) and (3) in the electronic paper operation section 40 are not used in the "music replay" application.

The numerals and symbols such as "1", "2", "3", "4", . . . are respectively displayed in key tops of the keys (4) to (15) in the electronic paper operation section 40 shown in FIG. 12. These display contents are displayed by referring to contents (in the rows 902-3-4, 902-3-5, . . . in FIG. 6) in the key top column (in the column 902-7 in FIG. 6) in the key function table 90-2 for the "music replay" application (shown in FIG. 6) without any change. The numerals and symbols displayed in the key tops are displayed on a direction suitable for using the mobile terminal 10 in a lateral form. That is, contents are displayed on a direction to be easily seen when the mobile terminal 10 is used laterally.

The characters and/or symbols such as "+", "menu", "CLR", . . . are also displayed in the key frame outside regions of the keys (4) to (10) in the electronic paper operation section 40 shown in FIG. 12. These display contents are displayed by referring to contents (in the rows 902-3-4 to 902-3-10 in FIG. 6) in the key frame outside region column (in the column 902-8 in FIG. 6) in the key function table 90-2 for the "music replay" application (shown in FIG. 6) without any change. The characters and/or symbols displayed in the key frame outside regions are displayed on a direction suitable for using the mobile terminal 10 laterally.

As described above, when an application is started in the mobile terminal 10, the use state (which is used longitudinally or laterally) of the mobile terminal 10 can also be instructed. In this case, key functions used in the application are displayed in the key tops and the key frame outside regions for the respective keys in the electronic paper operation section 40 of the mobile terminal 10 in a form which is suitable for a use state and easy see.

Next, a third example of operating the mobile terminal 10 according to the first exemplary embodiment will be described with reference to FIGS. 13 and 14. The third example of operating the mobile terminal 10 according to the first exemplary embodiment differs from the operation described in FIG. 8 in following aspects.

More specific, in FIG. 8, when an application is started; the control section 60 transmits a type of the started application and the key function table 90 to the electronic paper control section 41. The electronic paper control section 41 controls the electronic paper 42 to display the characters and/or symbols, which represent functions of the respective keys, in the key tops and the key frame outside regions for the respective keys on the electronic paper 42 of the electronic paper operation section 40 based on the key function table 90. Through this operation, functions of the respective keys are displayed on the electronic paper operation section 40 as exemplified in FIGS. 9 and 10.

On the other hand, in the third operation example according to the first exemplary embodiment, the control section 60 transmits the type of started application and the key function table 90 corresponding to the application to the electronic paper control section 41. The electronic paper control section 41 determines whether or not the characters and/or symbols to be displayed in the key frame outside regions for the respective keys are present by referring to the key function table 90. If the characters and/or symbols to be displayed in the key frame outside regions for the respective keys are absent, the electronic paper control section 41 displays a separately obtained design image in the entire key frame outside regions for the respective keys in the electronic paper operation section 40.

Figure 13:
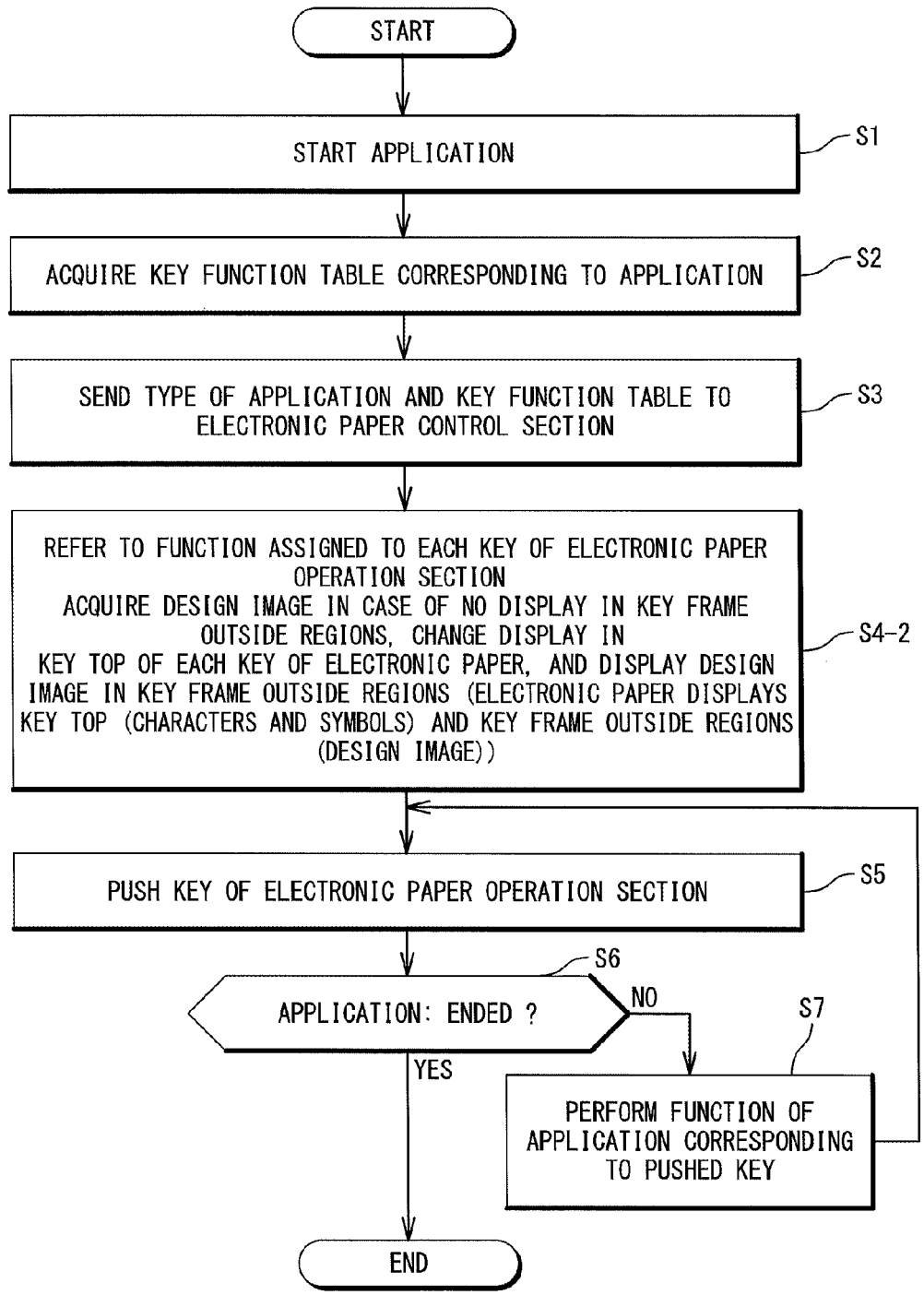
FIG. 13 is a third flowchart showing an operation of the mobile terminal according to the first exemplary embodiment of the present invention.

FIG. 13 is a third flowchart showing the third operation example of the mobile terminal according to the first exemplary embodiment. It should be noted that the same reference numerals and codes shown in FIG. 13 are assigned to the same component elements shown in FIG. 8 and explanation thereof will be omitted as much as possible.

In FIG. 13, the control section 60 starts an application (step S1 in FIG. 13) and obtains the key function table 90 corresponding to the application (step S2). Then, the control section 60 transmits the type of started application and the key function table 90 to the electronic paper control section 41 of the electronic paper operation section 40 (step S3). The operations so far are the same as the operations in the steps S1 to S3 shown in FIG. 8.

The electronic paper control section 41 refers to the key function table 90 received from the control section 60 to recognize functions assigned to the respective keys in the electronic paper operation section 40. Next, the electronic paper control section 41 determines whether or not there are the characters and/or symbols to be displayed in the key frame outside regions for the respective keys in the electronic paper operation section 40. Here, if the characters and/or symbols to be displayed in the key frame outside regions for the respective keys are absent, the electronic paper control section 41 obtains a design image, which is stored in advance in the storage section 50, via the control section 60. The electronic paper control section 41 performs a control in such a manner that the characters and/or symbols obtained from the key top column of the key function table 90 are displayed in the key tops for the respective keys in the electronic paper operation section 40. Simultaneously, the electronic paper control section 41 performs a control in such a manner that a design image obtained from the storage section 50 is displayed on the entire key frame outside regions in the electronic paper operation section 40 (step S4-2). The operations in step S-5 and the subsequent are the same as the operations described in FIG. 8 so that explanation thereof will be omitted.

Therefore, display contents (such as the characters and/or symbols in key tops and design image in the key frame outside regions) instructed by the electronic paper control section 41 are displayed on the electronic paper 42. One example of display contents to be displayed on the electronic paper 42 will be exemplified here in FIG. 14.

Figure 14:
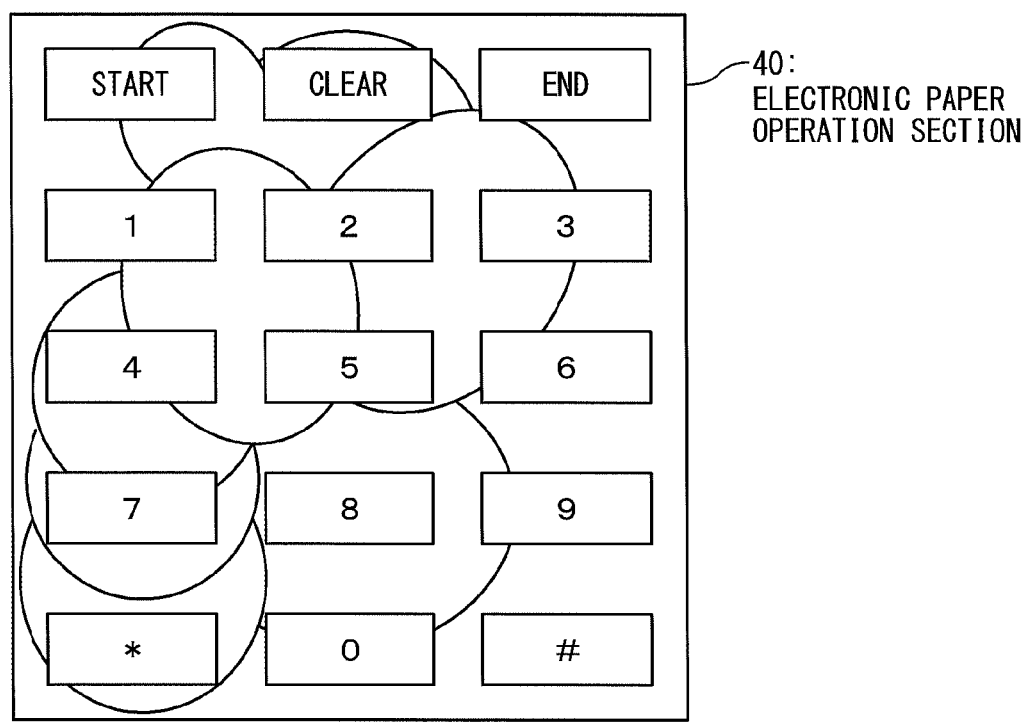
FIG. 14 is a diagram showing a display example when a design image is displayed in the key frame outside regions in the electronic paper operation section.

FIG. 14 shows a display example obtained when a design image is displayed in the key frame outside regions in the electronic paper operation section. It should be noted that the display example shown in FIG. 14 is one example of displaying the design image in the key frame outside regions of the electronic paper operation section 40 as shown in FIG. 3. The above design image may be a hand written image and may also be a picture or other images. Alternatively, it may be realized by imaging a combination of characters and symbols or the like.

The mobile terminal according to the first exemplary embodiment has been described above. The mobile terminal (i.e. mobile terminal 10) according to the first exemplary embodiment includes the operation section (i.e. the electronic paper 42 and the switch sheet 43 in the electronic paper operation section 40), the display control section (i.e. the electronic paper control section 41), the application control section (i.e. the control section 60) and the storage section (i.e. the storage section 50).

The operation section displays a plurality of keys for operating the mobile terminal on the display device (which is the electronic paper in the first exemplary embodiment). The application control section performs a control so as to start any of a plurality of applications of the mobile terminal. The storage section stores a table (which is the table 90) to determine a plurality of key functions in the operation section in accordance with each application of the mobile terminal.

The display control section performs a control to display the operation section display data such as characters/symbols on the display device of the operation section. More specifically, when any of the plurality of applications is started by the application control section, the display control section obtains the operation section display data which represent respective functions assigned to the plurality of keys in the operation section from a table stored in the storage section. Next, the display control section displays the operation section display data in a corresponding position inside and outside each of key frames of the respective keys on the display device of the operation section.

More specifically, the table stored in the storage section contains the first sub operation section display data to be displayed inside key frames of the plurality of keys used in the application, and the second sub operation section display data to be displayed outside the key frames of the keys.

The display control section is also operated as follows, when a use state of the mobile terminal is detected. More specifically, the display control section obtains a table from the application control section and detects the use state of the mobile terminal, and the operation section display data are displayed in corresponding positions inside and outside key frames of the respective keys on the display device of the operation section in a direction suitable for the use state.

Furthermore, if the second sub operation section display data to be displayed outside the key frames is absent in the table, the display control section displays the first sub operation section display data, which are obtained from the table and represent key functions, in a corresponding position inside each of key frames of the respective keys on the display device of the operation section. The display control section simultaneously displays a design image outside the key frames of the keys on the display device of the operation section.

The above operation section is configured by arranging the display device above the switch sheet having the tact switches. The above display device also includes an electronic paper. The mobile terminal according to the first exemplary embodiment is provided to display the operation section display data such as the characters/symbols, which represent functions of the respective keys, in the key frame internal and outside regions of the respective keys in the operation section for every application started in the mobile terminal.

Accordingly, the first exemplary embodiment can display functions of the operation keys in the mobile terminal so that the user of the mobile terminal can easily understand.

[Second Exemplary Embodiment]

Next, the mobile terminal according to a second exemplary embodiment of the present invention will be described with reference to FIGS. 15 to 17. The mobile terminal according to the second exemplary embodiment differs from the mobile terminal according to the first exemplary embodiment in the following point. More specifically, the electronic paper operation section 40 of the mobile terminal 10 according to the first exemplary embodiment shown in FIG. 4 has the electronic paper 42 arranged above the switch sheet 43. In contrast, an electronic paper operation section 40-2 according to the second exemplary embodiment includes a touch panel arranged above the electronic paper 42, which differs from the first exemplary embodiment.

Figure 15:
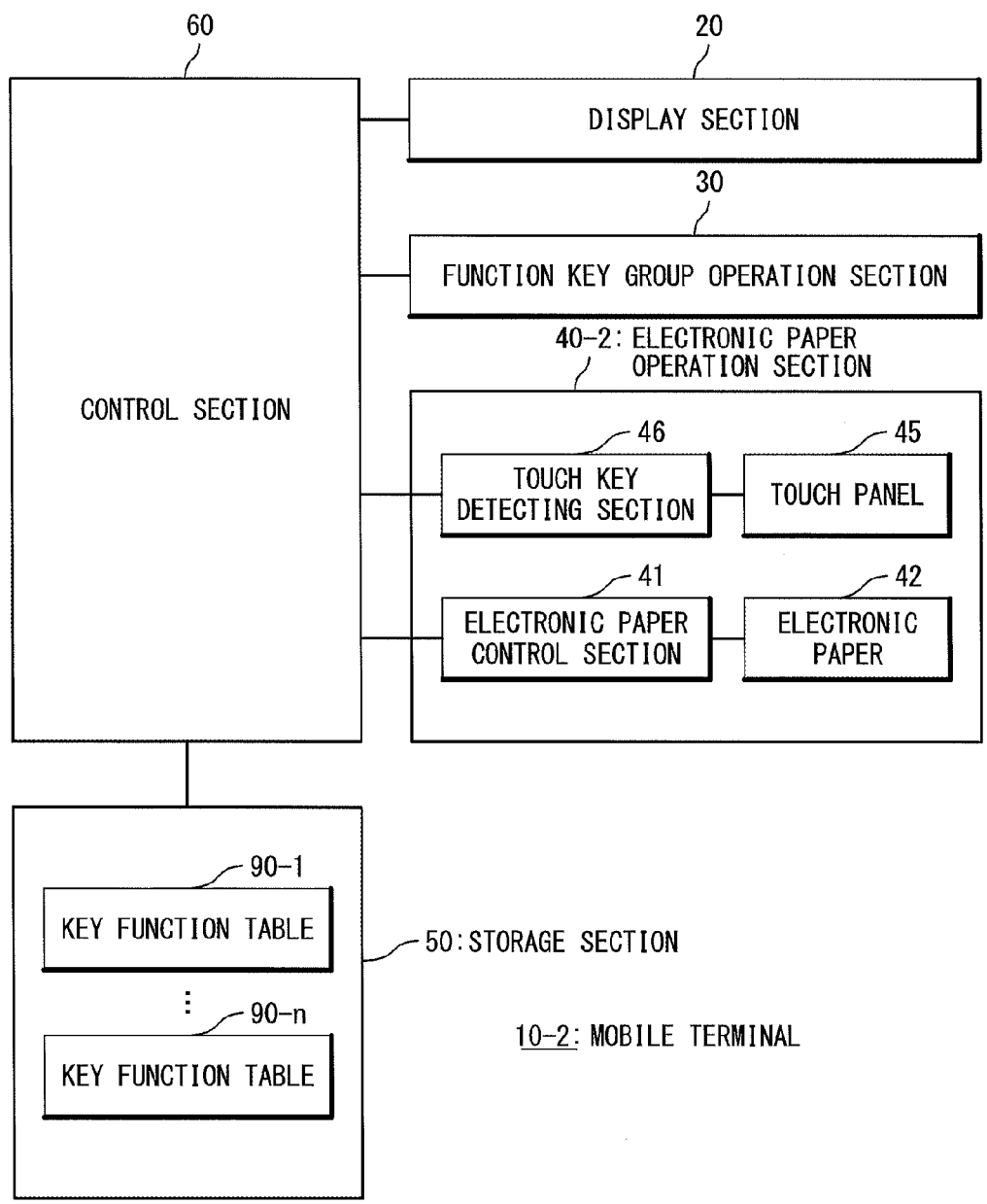
FIG. 15 is a block diagram showing the mobile terminal according to a second exemplary embodiment of the present invention.

FIG. 15 is a block diagram showing the mobile terminal according to the second exemplary embodiment. It should be noted that the same reference numerals and codes shown in FIG. 15 are assigned to the same component elements shown in FIG. 4 and explanation thereof will be omitted. A mobile terminal 10-2 shown in FIG. 15 includes the display section 20, the function key group operation section 30, the electronic paper operation section 40-2, the storage section 50 and the control section 60. The display section 20, the function key group operation section 30, the storage section 50 and the control section 60 are the same as those shown in FIG. 4, so that explanation thereof will be omitted.

The electronic paper operation section 40-2 includes a plurality of keys necessary to operate the mobile terminal 10-2. The electronic paper operation section 40-2 includes the electronic paper control section 41, the electronic paper 42, a touch panel 45 and a touch key detecting section 46. The electronic paper control section 41 and the electronic paper 42 are the same as those shown in FIG. 4, so that explanation thereof will be omitted.

The touch panel 45 has a function to detect a touched position by being touched with a human finger and/or a pen exclusively used therefor in order to send a detected position to the touch key detecting section 46. It should be noted that a method of detecting a position on the touch panel 45 is grouped into a type to detect a pressure change at a touched position and a type to sense an electric signal by static electricity at a touched position, and any of these types may be used for the panel in the second exemplary embodiment.

The touch panel 45 has 3×5 (=15) key frames printed on the panel in the same manner as those described with reference to FIG. 2. The touch panel 45 is arranged above the electronic paper 42. More specifically, the electronic paper 42 and the touch panel 45 constitute keys used in the second exemplary embodiment. The configurations of the electronic paper 42 and the touch panel 45 will be described later.

The touch key detecting section 46 detects whether any of the plurality of keys on the touch panel 45 is touched, or whether any of the plurality of keys in the electronic paper operation section 40 is touched, and outputs a signal indicating a type of the touched key to the control section 60.

Next, a configuration of the electronic paper 42 and the touch panel 45 in the electronic paper operation section 40-2 will be described with reference to FIG. 16. FIG. 16 shows a second example of the electronic paper operation section. The electronic paper operation section 40-2 shown in FIG. 16 has the touch panel 45 which is arranged on or above the electronic paper 42. The touch panel 45 shown here is transparent and allows the display of the electronic paper 42 arranged therebelow to be seen.

The key frames of 3×5 (=15) keys (i.e. substantially square frames, each of which indicates a frame of the key) are printed in advance on the touch panel 45 according to an arrangement similar to that exemplified in FIG. 3. Accordingly, if a portion of a left-end key frame in an uppermost row on the touch panel 45 (i.e. the key (1) in FIG. 3) is touched, it means that a left-end key in the uppermost row in the touch panel 45 is touched.

Figure 16:
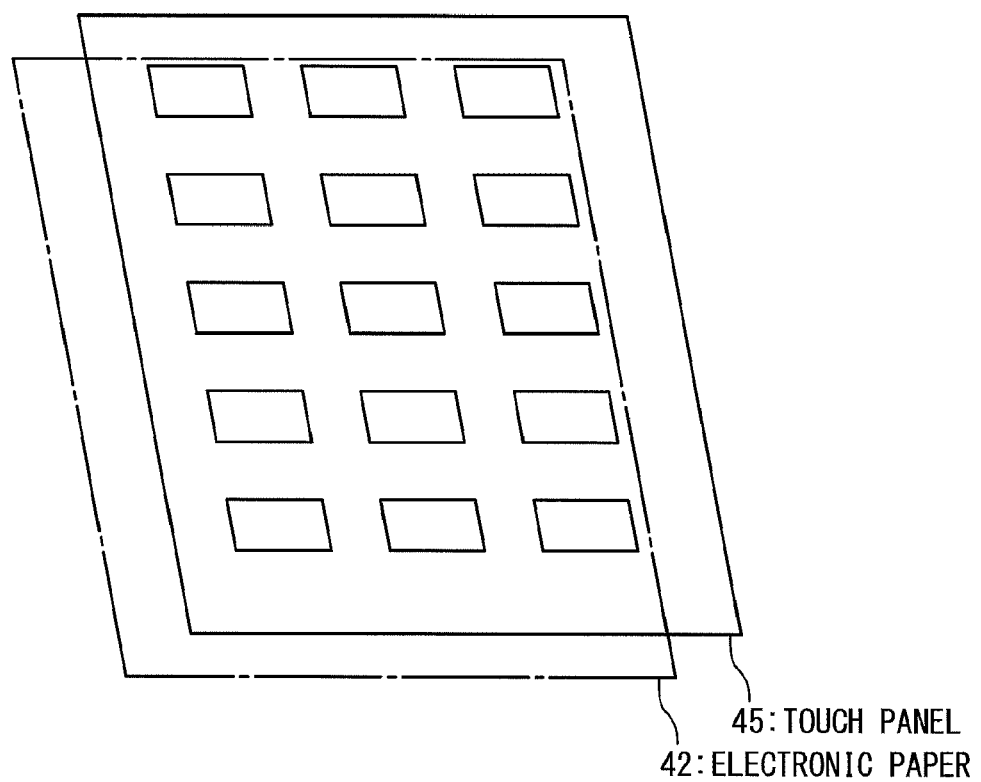
FIG. 16 shows a second constitution example of the electronic paper operation section.
Figure 17:
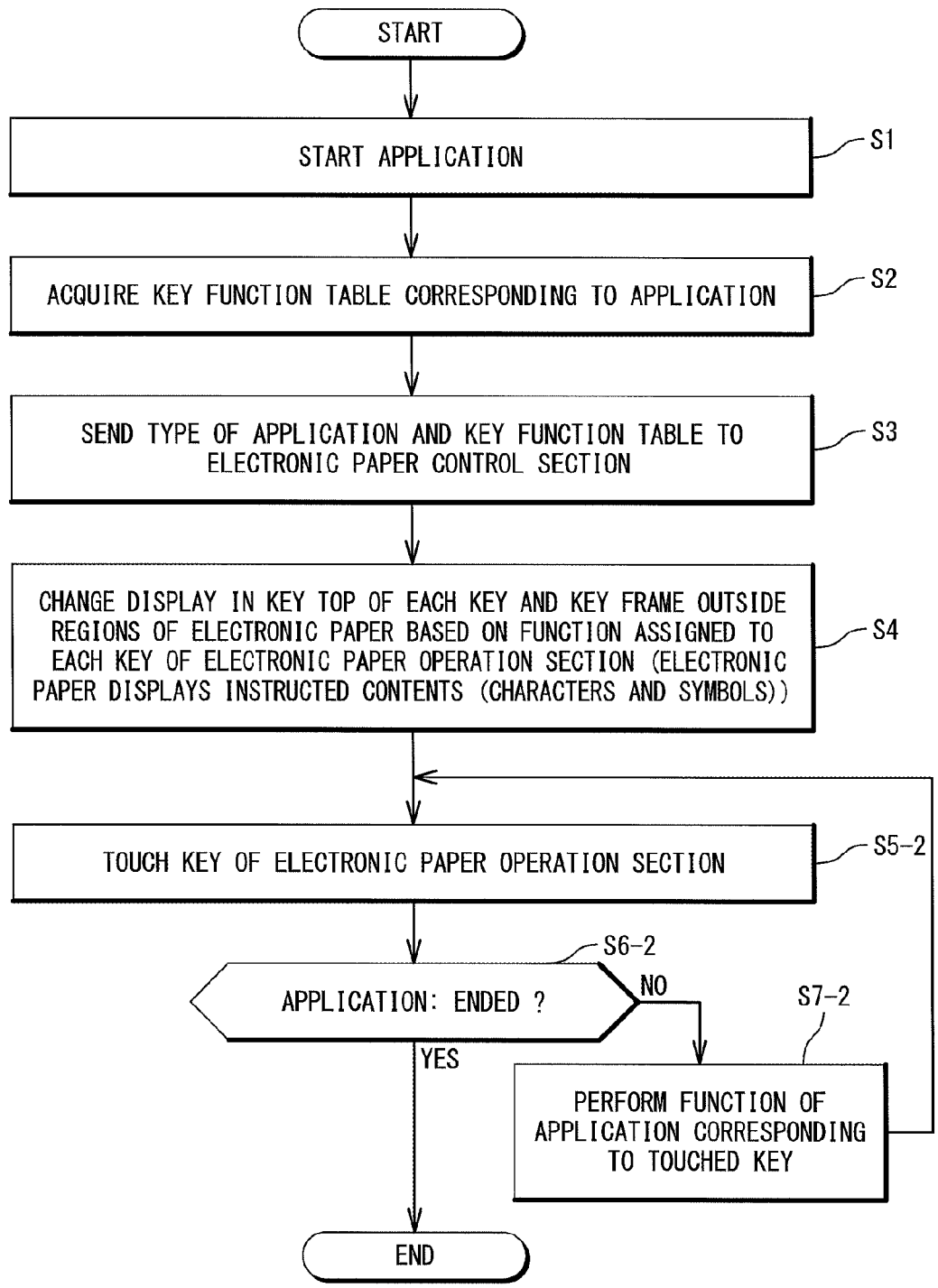
FIG. 17 is a flowchart showing an operation of the mobile terminal according to the second exemplary embodiment of the present invention.

It should be noted that the electronic paper control section 41 and the touch key detecting section 46 in the electronic paper operation section 40-2 shown in FIG. 16 are assumed to be mounted on a circuit substrate which is not shown in FIG. 16.

Next, an operation of the mobile terminal 10-2 according to the second exemplary embodiment will be described with reference to FIG. 17. FIG. 17 is a flowchart showing an operation of the mobile terminal according to the second exemplary embodiment. It should be noted that the same reference numerals and codes shown in FIG. 17 are assigned to the same components according to the first exemplary embodiment as shown in FIG. 8 and explanation thereof will be omitted as much as possible.

It should be noted that it is assumed that a power supply has been turned on in the mobile terminal 10-2 and various kinds of functions are brought into a startable state in the mobile terminal 10-2. Here, when one function selected from a plurality of functions of the mobile terminal 10-2 is started by the user of the mobile terminal 10-2, the control section 60 controls an application executing the function to start (step S1 in FIG. 17). The control section 60 obtains the key function table 90 corresponding to the application (step S2), and transmits a type of the started application and the key function table 90 to the electronic paper control section 41 of the electronic paper operation section 40-2 (step S3). The operations so far are the same as the operations in the steps S1 to S3 shown in FIG. 8.

The electronic paper control section 41 controls the characters and/or symbols, which represent functions of the respective keys, to be displayed in key tops and key frame outside regions for the respective keys in the electronic paper operation section 40-2 (step S4). The operation in the step S4 is also the same as the operation in the step S4 shown in FIG. 8.

Next, in order to execute any of various functions of a started application, the user of the mobile terminal 10-2 touches a desired key of the electronic paper operation section 40-2 (step S5-2). The touch key detecting section 46 of the electronic paper operation section 40-2 detects a key touch and outputs a signal indicating a type of the touched key to the control section 60.

The control section 60 determines whether or not the type of touched key is used to end the application (step S6-2). If the type of touched key is not used to end the application (no in step S6-2), the control section 60 controls the application to execute a function corresponding to the key (step S7-2). The control flow will return to the step S5-2. If the type of touched key is used to end the application (yes in step S6-2), the control section 60 ends the currently being executed application.

The mobile terminal according to the second exemplary embodiment has been described. The mobile terminal (which is the mobile terminal 10-2) according to the second exemplary embodiment differs from the mobile terminal (which is the mobile terminal 10) according to the first exemplary embodiment in the following points. That is, the operation section (which includes the electronic paper 42 and the switch sheet 43 in the electronic paper operation section 40) in the mobile terminal according to the first exemplary embodiment is configured from the electronic paper 42 and the touch panel 45 in the electronic paper operation section 40-2 in the second exemplary embodiment.

More specific, the mobile terminal (which is the mobile terminal 10-2) according to the second exemplary embodiment includes the operation section (which includes the electronic paper 42 and the touch panel 45 in the electronic paper operation section 40), the display control section (which is the electronic paper control section 41), the application control section (which is the control section 60), and the storage section (which is the storage section 50). The operation section has the plurality of keys for operating-the mobile terminal and is displayed on the electronic paper, and the operation section is configured to have the touch panel arranged above the electronic paper. Components other than the operation section such as the display control section, the application control section and the storage section are configured in the same as the first exemplary embodiment.

It should be noted that the above electronic paper 42 according to the second exemplary embodiment may be replaced with FPD (Flat Panel Display) other than the electronic paper. The FPD is a display apparatus with a planar frame and a flat screen. Such a FPD can be an LCD (Liquid Crystal Display) and a PDP (Plasma Display Panel) or the like. Other examples of the FPD include an LED (Light Emitting Diode) display and an EL (Electro Luminescence) display or other displays. If such a FPD is used, the electronic paper control section 41 shown in FIG. 15 may be replaced with a control section for driving each FPD.

The mobile terminal according to the second exemplary embodiment allows the operation section display data such as the characters/symbols, which represent functions of the respective keys, to be displayed inside and outside the key frames of the respective keys in the operation section in accordance with the started application in the mobile terminal. The configuration of the operation section is simplified in comparison with the first exemplary embodiment. According to the second exemplary embodiment, it is possible to display the functions of the respective operation keys in the mobile terminal so that the user of the mobile terminal can easily understand, and a simple configuration of the mobile terminal can be realized and cost for the mobile terminal can be reduced.

[Third Exemplary Embodiment]

In the mobile terminals according to the first exemplary embodiment and the second exemplary embodiment, the operation section display data made of a pair of the first sub operation section display data which is displayed in the key frame inside regions of the respective keys and the second sub operation display data which is displayed in the key frame outside regions thereof is displayed on the operation section. The mobile terminal according to the third exemplary embodiment allows the operation section display data, which is not divided into the respective keys, to be displayed on the operation section.

Figure 18:
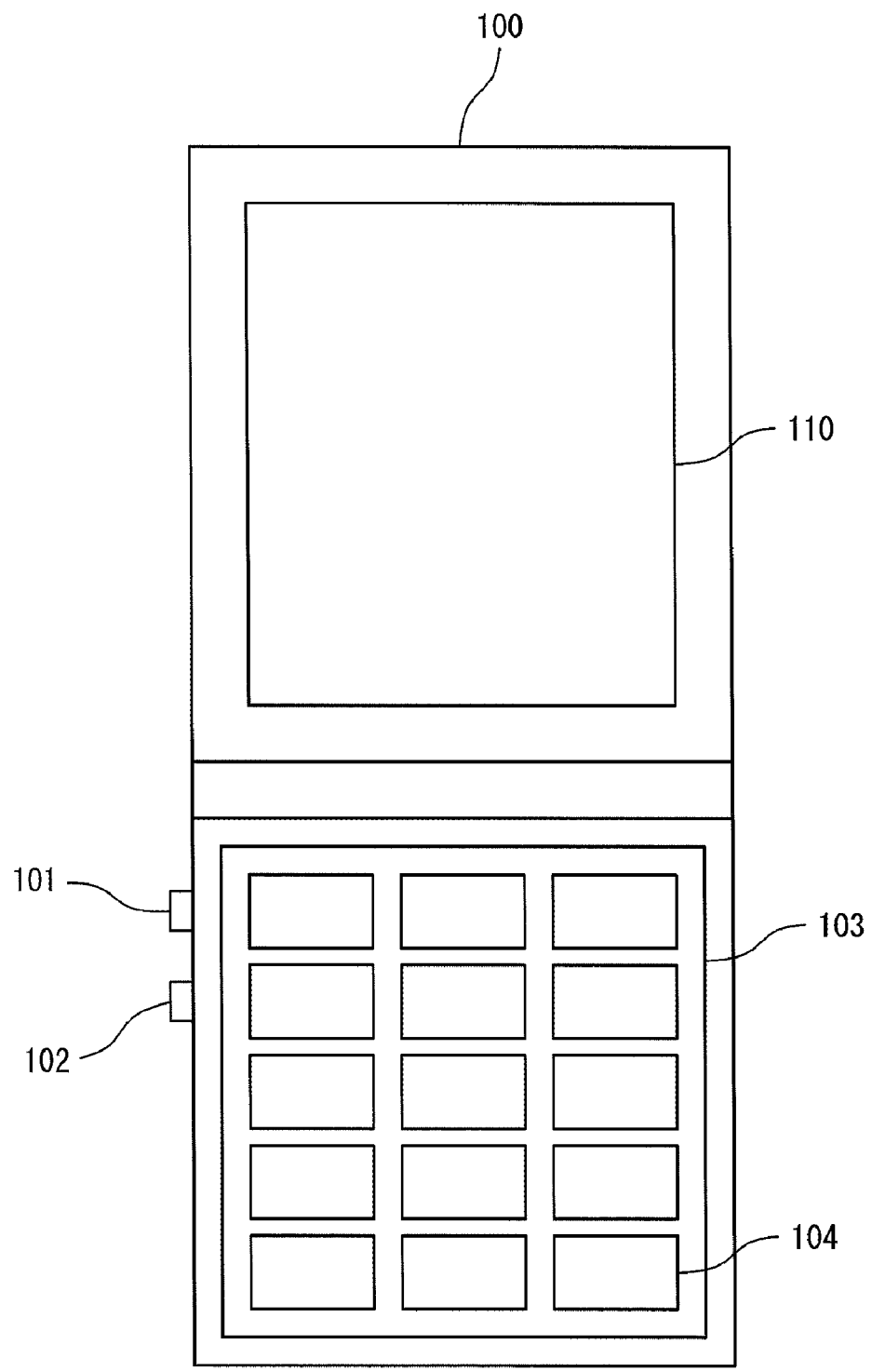
FIG. 18 shows the mobile terminal according to a third exemplary embodiment.

FIG. 18 shows the mobile terminal according to the third exemplary embodiment. As shown in FIG. 18, a mobile terminal 100 according to the third exemplary embodiment is provided with an operation section 103 including a first side key 101, a second side key 102 and operation keys 104, in addition to an LCD display section 110. An electronic paper is mounted on the operation section 103, and a function is provided to change display content shown in the operation section 103 by supplying operation section display data to the electronic paper. Not only the inside of each key frame but also each key frame as well as the outside of each key frame are made transparent so that the electronic paper serving as a foundation can be seen.

A function to turn on/off the LCD display section 110 is mounted on the side key 101. The LCD display section 110 is switched to be turned off by pressing the side key 101 when the LCD display section 101 is turned on. When the LCD display section 101 is turned off, the LCD display section 101 transits to a low power consumption mode and contents displayed on the LCD display section 101 are deleted. The LCD display section 110 is switched to be turned on by pressing the side key 101 when the LCD display section 110 is in the off state. When LCD display section 110 is turned on, the low power consumption mode thereof is canceled and display contents appear on the LCD display section 110.

A function to turn on/off a key function menu display is implemented on the side key 102. While it is turned on to display the key function menu, functions assigned to the respective operation keys are displayed on the operation section 103. If the side key 102 is pushed at this time, the display of the key function menu is turned off, and the display control section 3 stops supply of the operation section display data for the key function menu to the electronic paper. Due to the stop of supply of the operation section display data, the functions displayed and assigned to the operation keys are deleted. The display control section 3 supplies to the electronic paper, a display section display data which has been supplied to the LCD display section 110, in place of the operation section display data. The same contents as that on the LCD display section 110 when the key function menu is deleted are displayed on the operation section 103 in place of key functions.

Each of the keys 104 is provided with recessed and projecting portions. Due to the recessed and projecting portions, the user can recognize and press a key which the user wishes to select even if nothing is displayed on the electronic paper.

Operational examples of the mobile terminal according to the third exemplary embodiment will be described. A case of using an application to read a novel by the user will be described here.

1-1) Start Novel Application

When a power supply is turned on in the mobile terminal, a key function menu is displayed on the operation section 103. When the user carries out a key operation to start an application in order to read a novel, the application control section 4 controls a novel application to start. When the novel application is started, a novel is displayed on the LCD display section 110 as shown in FIG. 19, and a key function menu corresponding to the novel application is displayed on the operation section 103.

Figure 19:
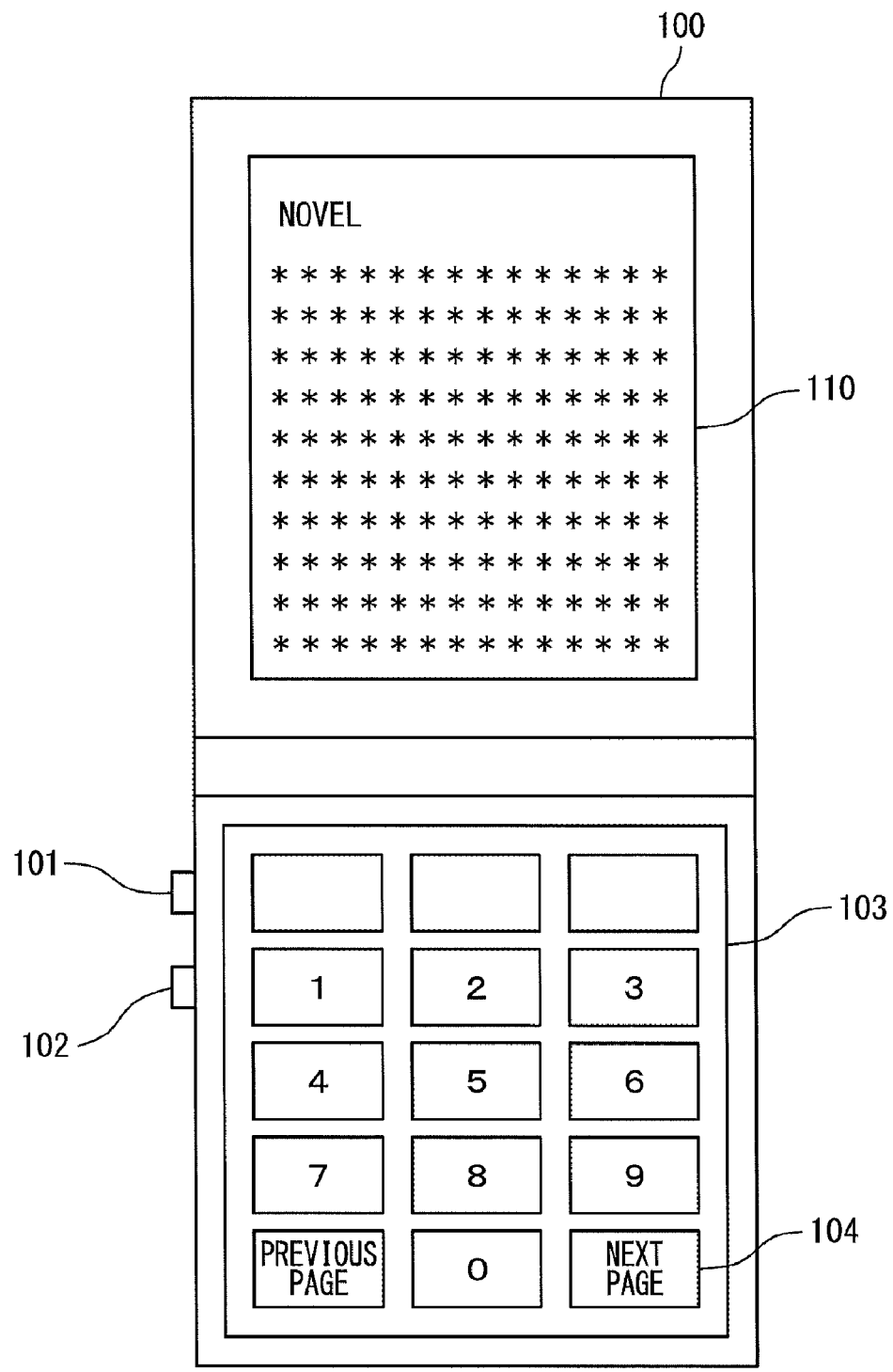
FIG. 19 is a diagram showing the mobile terminal observed when a novel application is started.

Referring to the key function menu shown in FIG. 19, a legend "previous page" is displayed on a bottom left key frame of the operation section 103 and a legend "next page" is displayed on a bottom right key frame of the operation section 103. If the user performs an operation to press a key on which the legend "previous page" is displayed, the novel application returns a page of the novel displayed on the LCD display section 110 to go to the previous page. In contrast, if the user performs an operation to press the key 104 on which the legend "next page" is displayed, the novel application advances a page of the novel displayed on the LCD display section 110 to the next page.

1-2) Transition of LCD Display Section to Low Power Consumption Mode

Figure 20:
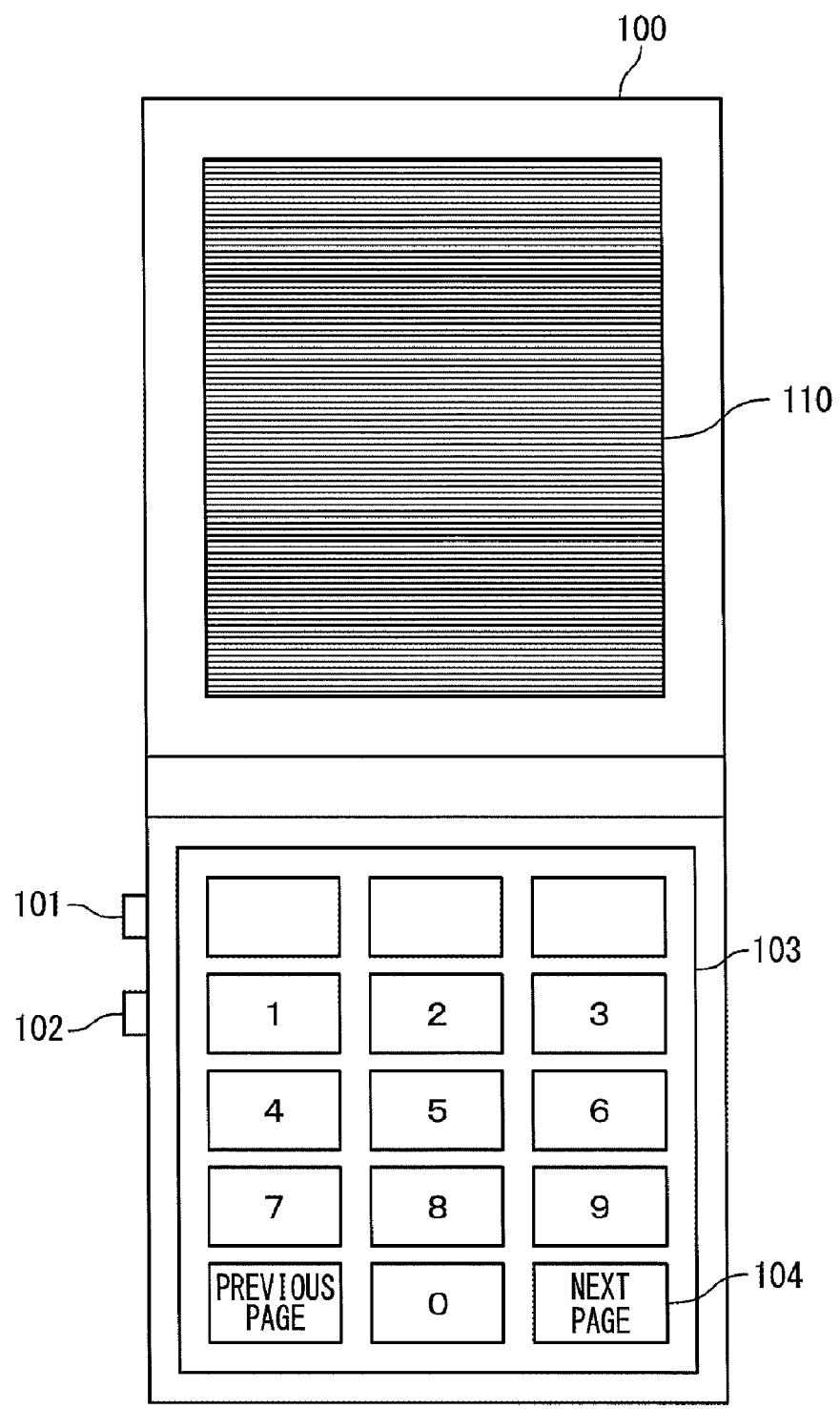
FIG. 20 is a diagram showing the mobile terminal when a side key 101 is pushed.

If the user performs an operation to press the side key 101 in a state shown in FIG. 19, the mobile terminal 100 stops supply of power to the LCD display section 110 and the LCD display section 110 transits to a low power consumption mode. As shown in FIG. 20, the display contents of the LCD display section 110 disappear.

1-3) Switch of Display to Electronic Paper

Figure 21:
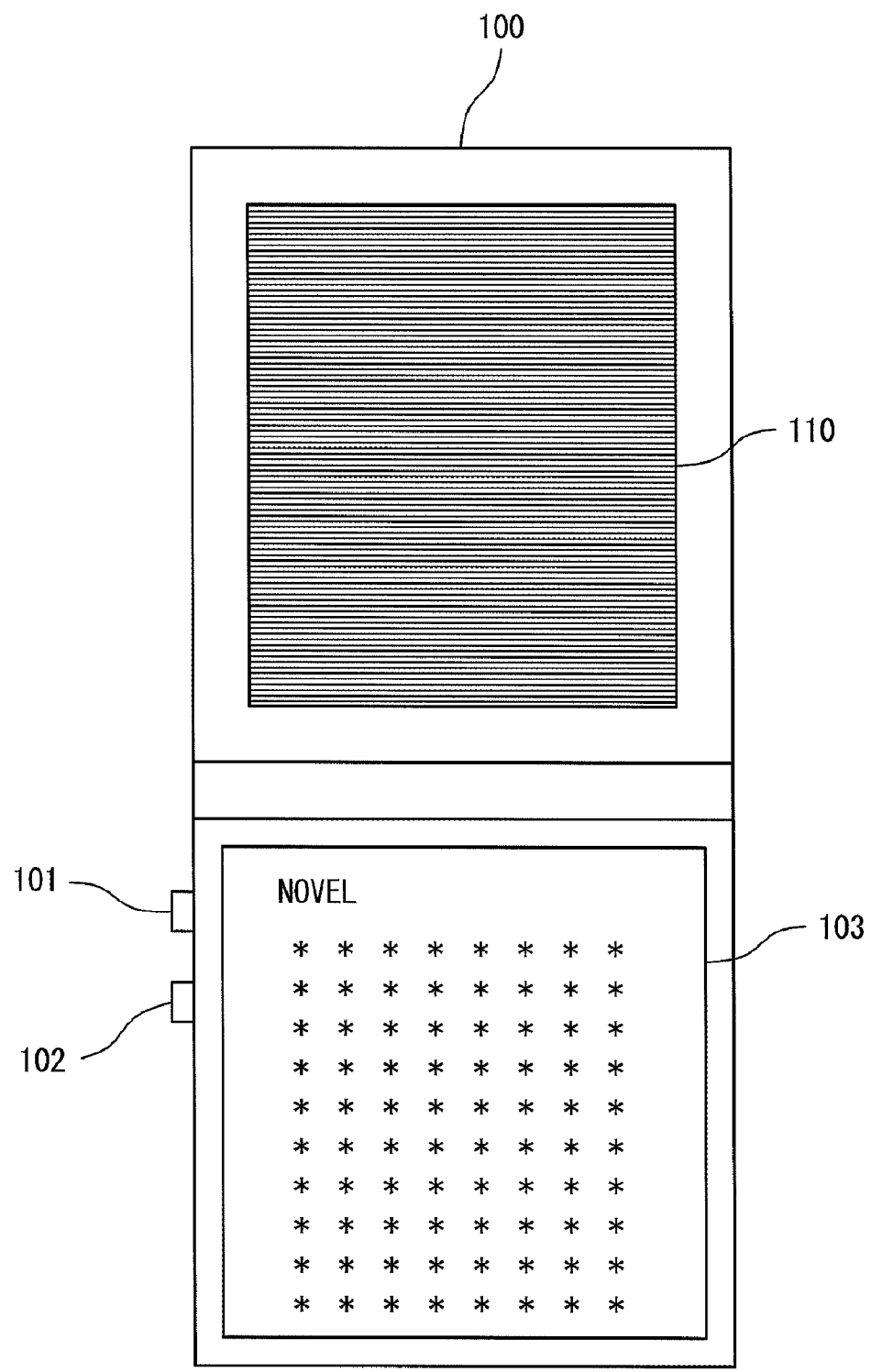
FIG. 21 is a diagram showing the mobile terminal observed when a side key 102 is pushed.

After turning off the LCD display section 110, if the user performs an operation to press the side key 102, the key function menu displayed on the operation section 103 disappears. Simultaneously, as shown in FIG. 21, an output destination of the display section display data of the novel application is switched from the LCD display section 110 to the electronic paper. In place of the key function menu displayed in the key tops, the novel which has been displayed on the LCD display section 110 is displayed on the operation section 103.

1-4) Execution of Novel Application in LCD Display Section in Low Power Consumption Mode The power supplied to the LCD display section 110 is turned off and the key function menu displayed in the key tops is turned off, and then the novel is displayed on the electronic paper. Functions assigned to the respective keys can be used in the same manner as the case before transition to the low power consumption mode. More specifically, if the user performs an operation to press the bottom left key on which the legend "pervious page" is displayed, the novel application returns a page of the novel displayed on the electronic paper to the previous page. In contrast, if the user performs an operation to press the key 104 on which the legend "next page" is displayed, the novel application advances a page of the novel displayed on the electronic paper to the next page.

1-5) Identification of Key Tops

Figure 22:
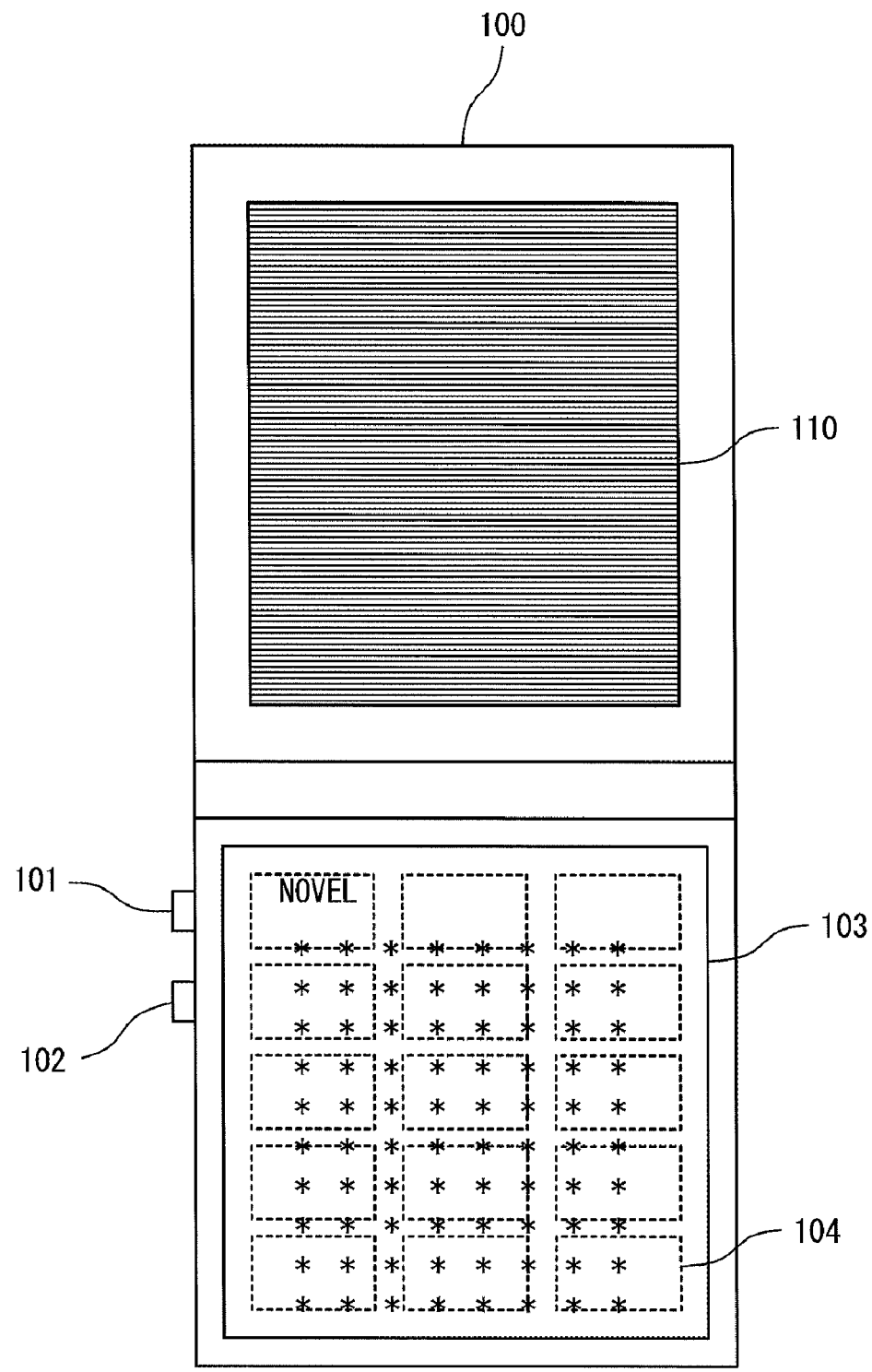
FIG. 22 is a diagram showing recessed and projecting portions of key tops which can be recognized by the user.

Since display of the key function menu is in the off state, it is difficult for the user to recognize functions assigned to keys through visual observation of the key tops. However, even though key functions are not displayed, the key portions can be recognized sufficiently by the recessed and projecting portions of the key tops as shown in FIG. 22. If the user remembers the functions assigned to the keys, the functions can be used. For example, a page of the novel displayed on the electronic paper can be transited to the next page by pressing the bottom right key 104.

Figure 23:
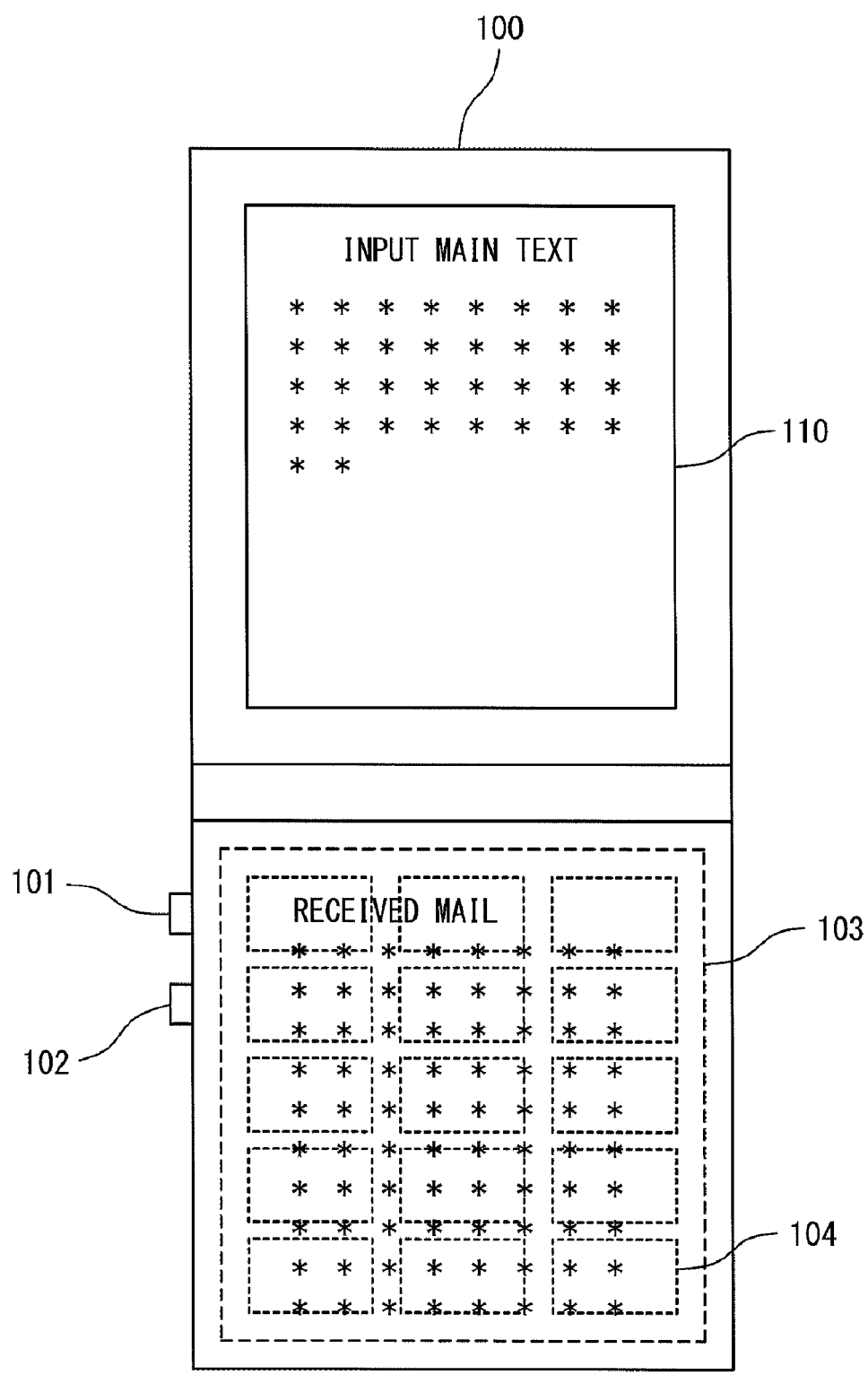
FIG. 23 is a diagram showing the mobile terminal in production of a reply mail.

Other operation example of the mobile terminal according to the third exemplary embodiment will be described. FIG. 23 is a diagram for another operation example in a case of starting an electronic mail application.

2-1) Start Electronic Mail Application

When the power supply is turned on in the mobile terminal, a key function menu is displayed on the operation section 103. If the user performs a key operation to start an application in order to transmit/receive an electronic mail, the application control section 4 controls an electronic mail application to start. If the user further performs an operation to display a received mail in an inbox, the received mail is displayed on the LCD display section 110 and the key function menu corresponding to the electronic mail application is also displayed on the operation section 103.

2-2) Switch Display to Electronic Paper

If the user performs an operation to press the side key 102, the key function menu displayed on the operation section 103 disappears. Simultaneously, an output destination of the display section display data of the electronic mail application is switched from the LCD display section 110 to the electronic paper. In place of the key function menu displayed in the key tops, the received mail having been displayed on the LCD display section 110 is displayed on the operation section 103. After displaying the received mail, the display control section 3 transits to the low power consumption mode, to stop the output of the display data to the electronic paper. The electronic paper continues to display the received mail until new display data is supplied thereto.

2-3) Continuation of Electronic Mail Application

The key function menu is not displayed on the operation section. However, the functions assigned to the keys can be used in the same manner as the case before switching display to the electronic paper. More specifically, if the user performs a key operation to call a screen so as to produce a reply mail, the electronic mail application controls the LCD display section 110 to display a screen to produce the reply mail. It is possible for the user to perform a key operation so as to produce the reply mail while looking at the received mail displayed on the operation section 103. The received mail is continuously displayed on the electronic paper until the user ends producing the reply mail.

2-4) Identification of Key Tops

Since display of the key function menu is in the off state, it is difficult for the user to recognize the functions assigned to the keys through visual observation of the key tops. However, even though the key functions are not displayed, the keys can be sufficiently recognized by the recessed and projecting potions of the key tops as shown in FIG. 23. If the user remembers the functions assigned to the keys, the functions can be used.

According to the third exemplary embodiment, the LCD display section 110 can be turned off by switching a function which is not accompanied by frequent switching of display contents so as to be displayed on the electronic paper portion. Therefore, an application can be enjoyed in the low power consumption mode without impairing operability. The operation section 103 can be utilized as a second display screen, and if the user can perform a text input operation or other operations without looking at key tops, remarkable improvement of usability can be expected. As exemplified above, it is made possible to produce the reply mail while displaying the received mail in the key operation section 103 at the time of replying a mail.

The present invention described above referring to the exemplary embodiments and the examples is not limited to the above exemplary embodiments and the examples. Various modifications and changes can be appropriately conducted to the configuration and details of the present invention by those who are skilled in the art in a range of technical ideas of the present invention in the scope of claims.

The invention claimed is:
1. A mobile terminal comprising:
an operation section comprising a plurality of keys;
a display device configured to display an operation section display data in said operation section,
an application control section configured to start an application specified by a user operating said plurality of keys;
a display control section configured to supply said operation section display data to said display device when said application has been started, such that said operation section display data is displayed in a region which is contained in said operation section and in both of a key frame inside region and a key frame outside region for each of said plurality of keys; and
a storage section configured to store a table in which the application and said operation section display data are related to each other,
wherein when said application has been started, said display control section refers to said table to acquire said operation section display data related to said application.

2. The mobile terminal according to claim 1, wherein said storage section stores said table in which a first sub operation section display data to be display in said key frame inside regions and a second sub operation section display data to be displayed in said key frame outside regions are related to each other as said operation section display data.

3. The mobile terminal according to claim 2, wherein said display control section detects a use state of said mobile terminal, and converts an orientation of said operation section display data in an orientation suitable for the detected use state to supplies to said display device.

4. The mobile terminal according to claim 2, wherein when said display control section refers to said table and detects that there is not said second sub operation section display data, said display control section supplies a predetermined design image as said second sub operation section display data to said display device such that the predetermined design image is displayed in said key frame outside regions.

5. The mobile terminal according to claim 1, wherein said operation section comprises:
   a switch sheet having tact switches for at least a part of said plurality of keys,
   wherein said switch sheet
   said display device is arranged on said switch sheet.

6. The mobile terminal according to claim 5, wherein said display device comprises an electronic paper.

7. The mobile terminal according to claim 1, wherein said operation section comprises
   a touch panel, and
   wherein said touch panel is arranged on said display device.

8. The mobile terminal according to claim 1, further comprising:
   a display section provided in a region different from said operation section and configured to display a display section display data,
   wherein said display control section supplies said display section display data to said display device in place of said operation section display data, in response to a predetermined first operation.

9. The mobile terminal according to claim 8, wherein said display section stops the display of said display section display data and enters a low consumed power mode, in response to a second operation.

10. The mobile terminal according to claim 8, wherein said display control section enters the low consumed power mode and stops the supply of said display section display data to said display device, after supplying said display section display data to said display device in place of said operation section display data, in response to said first operation.

11. The mobile terminal according to claim 10, wherein said display section maintains the display of said display section display data after said display device displays said display section display data in said operation section.

12. The mobile terminal according to claim 9, further comprising:
   a first exclusive use key to which said first operation is assigned.

13. The mobile terminal according to claim 9, further comprising a second exclusive use key to which the second operation is assigned.

14. The mobile terminal according to claim 11, wherein said plurality of keys in said operation section have recessed and projecting portions which can be recognized by the user even when there are not a display of a key function in key frames and a display of key frames.

15. An operation section display method comprising:
   supplying an operation section display data to a display device when an application of a mobile terminal has been started, such that said display section display data is displayed in a region which is contained in an operation section comprising a plurality of keys and in both of key frame inside regions and key frame outside regions for said plurality of keys;
   displaying said operation section display data in said operation section by said display device; and
   storing a table in which the application and said operation section display data are related to each other,
   wherein said supplying an operation section display data comprises:
   acquiring said operation section display data related to said application by referring to said table, when said application has been started.

16. The operation section display method according to claim 15, wherein said storing comprises:
   storing said table in which a first sub operation section display data to be display in said key frame inside regions and a second sub operation section display data to be displayed in said key frame outside regions are related to each other as said operation section display data.

17. The operation section display method according to claim 16, wherein said supplying an operation section display data comprises:
   detecting a use state of said mobile terminal; and
   converting an orientation of said operation section display data into an orientation suitable for the detected use state to supplies to said display device.

18. The operation section display method according to claim 16, further comprising:
   supplying, when referring to said table and detecting that there is not said second sub operation section display data, a predetermined design image as said second sub operation section display data to said display device such that the predetermined design image is displayed in said key frame outside regions.

* * * * *